United States Patent
Inoue et al.

(10) Patent No.: US 9,439,198 B2
(45) Date of Patent: Sep. 6, 2016

(54) RADIO BASE STATION, RADIO COMMUNICATION SYSTEM AND RADIO COMMUNICATION METHOD

(71) Applicant: NTT DOCOMO, INC., Tokyo (JP)

(72) Inventors: Yuki Inoue, Tokyo (JP); Satoshi Nagata, Tokyo (JP); Takehiro Nakamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 31 days.

(21) Appl. No.: 14/387,383

(22) PCT Filed: Feb. 8, 2013

(86) PCT No.: PCT/JP2013/053031
§ 371 (c)(1),
(2) Date: Sep. 23, 2014

(87) PCT Pub. No.: WO2013/145885
PCT Pub. Date: Oct. 3, 2013

(65) Prior Publication Data
US 2015/0094076 A1    Apr. 2, 2015

(30) Foreign Application Priority Data

Mar. 30, 2012    (JP) ................................. 2012-081085

(51) Int. Cl.
*H04W 72/00*    (2009.01)
*H04W 72/04*    (2009.01)
(Continued)

(52) U.S. Cl.
CPC ......... *H04W 72/046* (2013.01); *H04B 7/0615* (2013.01); *H04B 7/0697* (2013.01);
(Continued)

(58) Field of Classification Search
CPC ....................................................... H04W 72/04
USPC ....................................................... 455/452.1
See application file for complete search history.

(56) References Cited

U.S. PATENT DOCUMENTS 8,010,161 B2 * 8/2011 Umeda et al. ................. 455/561
8,509,167 B2 * 8/2013 Chun et al. .................... 370/329
(Continued)

FOREIGN PATENT DOCUMENTS

JP    2008-219338 A    9/2008
JP    2009-033717 A    2/2009
(Continued)

OTHER PUBLICATIONS

International Search Report for corresponding International Application No. PCT/JP2013/053031, mailed Apr. 16, 2013 (2 pages).
(Continued)

*Primary Examiner* — Santiago Garcia
(74) *Attorney, Agent, or Firm* — Osha Liang LLP

(57) ABSTRACT

The present invention is designed to make effective use of radio resources in VSEC to output a plurality of beams of varying tilt angles for sectorization in vertical directions. A radio communication method for a radio base station that outputs a plurality of beams of varying tilt angles and forms a plurality of cells that are sectorized vertically, and a user terminal that establishes wireless connection with the radio base station, provides the steps in which the radio base station acquires information about the communication capacity of each of the plurality of cells, and controls the vertical plane beam width and/or transmission power of each cell and sets the coverage area of each cell so that differences in communication capacity between the plurality of cells are reduced.

4 Claims, 23 Drawing Sheets

(51) Int. Cl.

| | | |
|---|---|---|
| *H04W 16/28* | (2009.01) | |
| *H04B 7/06* | (2006.01) | |
| *H04W 52/14* | (2009.01) | |
| *H04W 52/34* | (2009.01) | |
| *H04W 16/08* | (2009.01) | |
| *H04W 16/30* | (2009.01) | |
| *H04W 52/42* | (2009.01) | |
| *H04W 88/08* | (2009.01) | |

(52) U.S. Cl.
CPC ......... *H04W 16/28* (2013.01); *H04W 52/143* (2013.01); *H04W 52/343* (2013.01); *H04W 72/0446* (2013.01); *H04W 72/0486* (2013.01); *H04W 16/08* (2013.01); *H04W 16/30* (2013.01); *H04W 52/42* (2013.01); *H04W 88/08* (2013.01)

(56) References Cited

U.S. PATENT DOCUMENTS

| | | | |
|---|---|---|---|
| 2002/0164954 A1* | 11/2002 | Jalali | 455/67.1 |
| 2005/0064872 A1* | 3/2005 | Osseiran et al. | 455/452.1 |
| 2007/0263580 A1* | 11/2007 | Grob-Lipski et al. | 370/338 |
| 2008/0268859 A1* | 10/2008 | Lee et al. | 455/450 |
| 2008/0273515 A1 | 11/2008 | Stopler et al. | |
| 2010/0020702 A1* | 1/2010 | Wong et al. | 370/252 |
| 2010/0118827 A1* | 5/2010 | Sundaresan et al. | 370/330 |
| 2010/0240384 A1* | 9/2010 | Nobukiyo et al. | 455/452.1 |
| 2010/0296461 A1* | 11/2010 | Yoshii et al. | 370/329 |
| 2011/0022714 A1* | 1/2011 | Nobukiyo | 709/226 |
| 2011/0128939 A1* | 6/2011 | Lim et al. | 370/335 |
| 2011/0211487 A1* | 9/2011 | Han et al. | 370/252 |
| 2012/0015684 A1* | 1/2012 | Noji | H04B 7/028 455/524 |
| 2012/0020431 A1* | 1/2012 | Tanabe | 375/295 |
| 2012/0282979 A1* | 11/2012 | Ashraf et al. | 455/561 |
| 2013/0121185 A1* | 5/2013 | Li et al. | 370/252 |
| 2013/0136029 A1* | 5/2013 | Matsuo et al. | 370/252 |
| 2013/0188590 A1* | 7/2013 | Aiba et al. | 370/329 |
| 2013/0237218 A1* | 9/2013 | Li et al. | 455/434 |
| 2014/0211731 A1 | 7/2014 | Inoue et al. | |
| 2014/0241260 A1* | 8/2014 | Schmidt et al. | 370/329 |

FOREIGN PATENT DOCUMENTS

| | | |
|---|---|---|
| JP | 2011-19039 A | 1/2011 |
| JP | 2011-177604 A | 9/2011 |
| JP | 2012-54736 A | 3/2012 |
| WO | 2011/029497 A1 | 3/2011 |

OTHER PUBLICATIONS

3GPP TR 25.913 V9.0.0; "3rd Generation Partnership Project; Technical Specification Group Radio Access Network; Requirements for Evolved UTRA (E-UTRA) and Evolved UTRAN (E-UTRAN) (Release 9);" Dec. 2009 (18 pages).

O. Yilmaz et al.; "System Level Analysis of Vertical Sectorization for 3GPP LTE;" IEEE; Department of Communications and Networking, Helsinki University of Technology; Espoo, Finland; 2009; pp. 453-457 (5 pages).

Office Action in counterpart Japanese Patent Application No. 2012-081085 issued on Mar. 29, 2016 (8 pages).

* cited by examiner

N: NUMBER OF VERTICAL SECTORS
K: NUMBER OF HORIZONTAL SECTORS

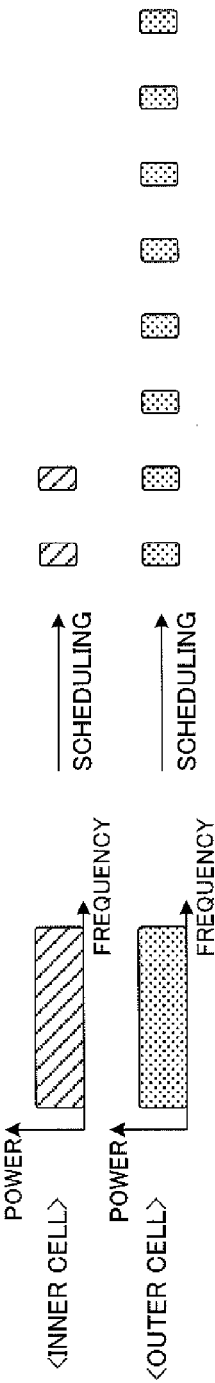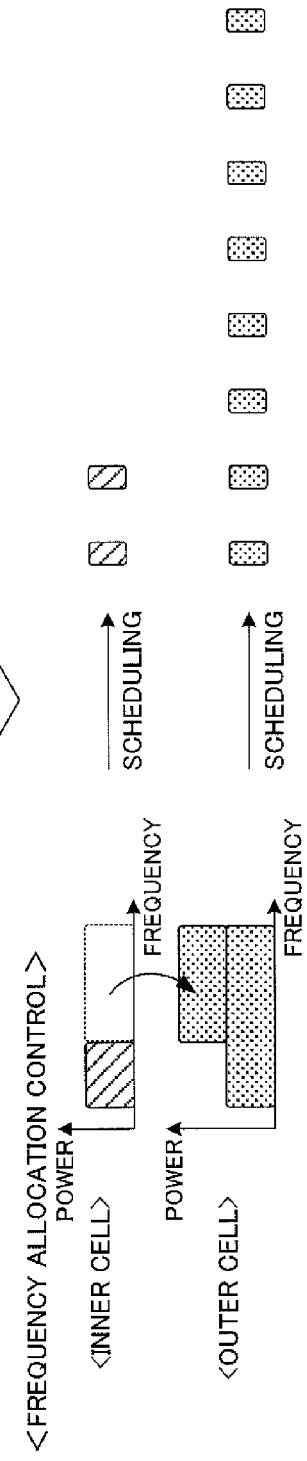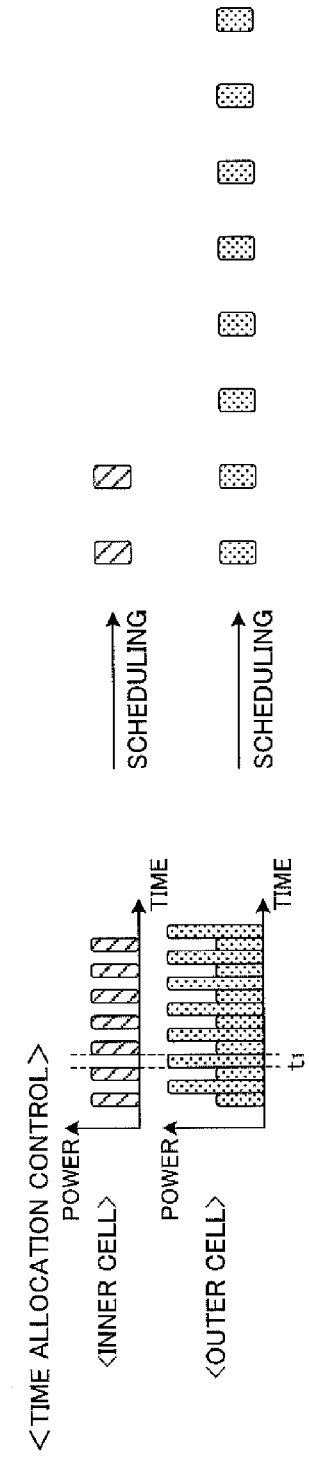

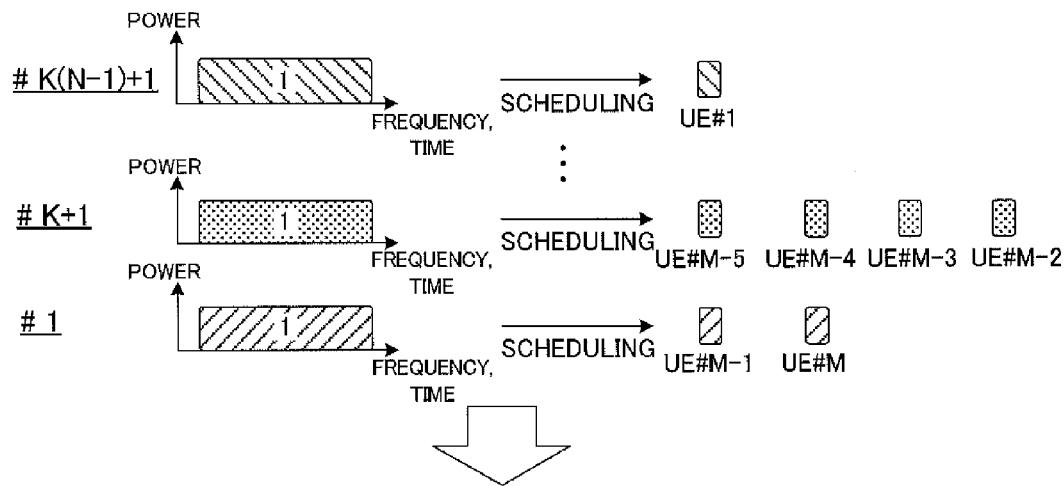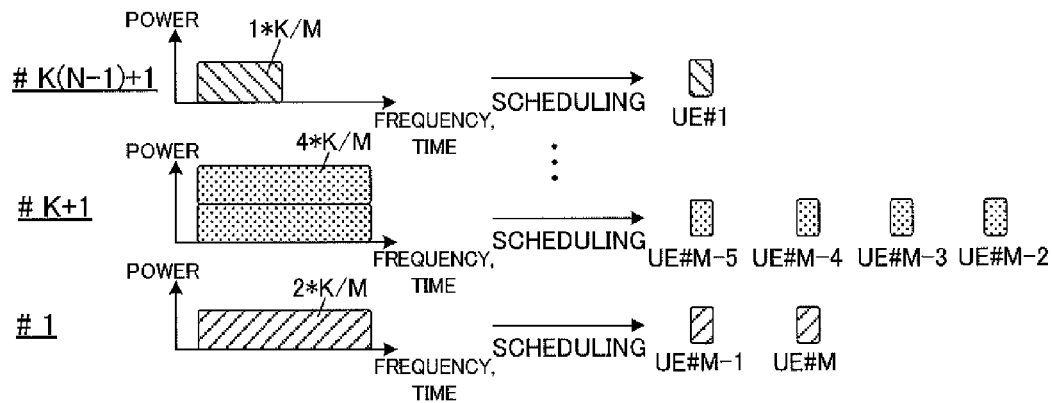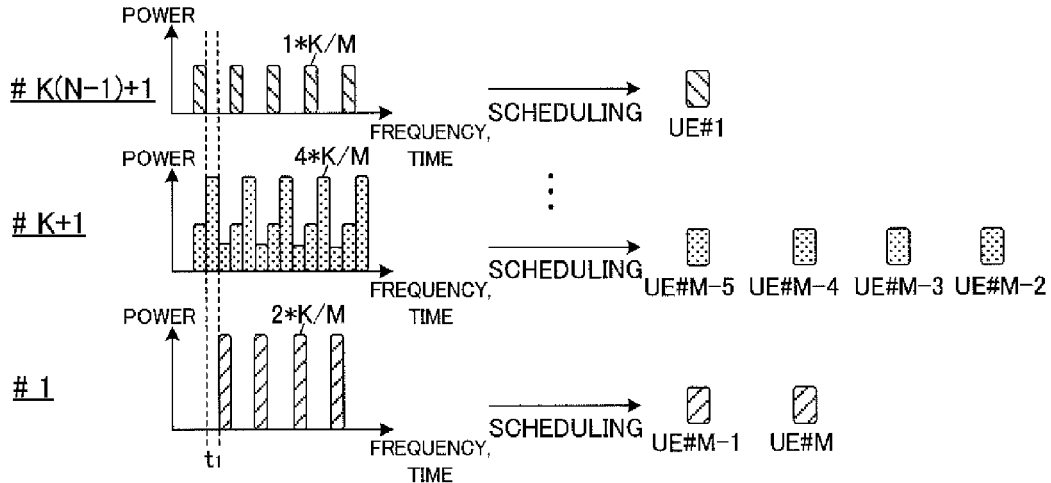
FIG.12

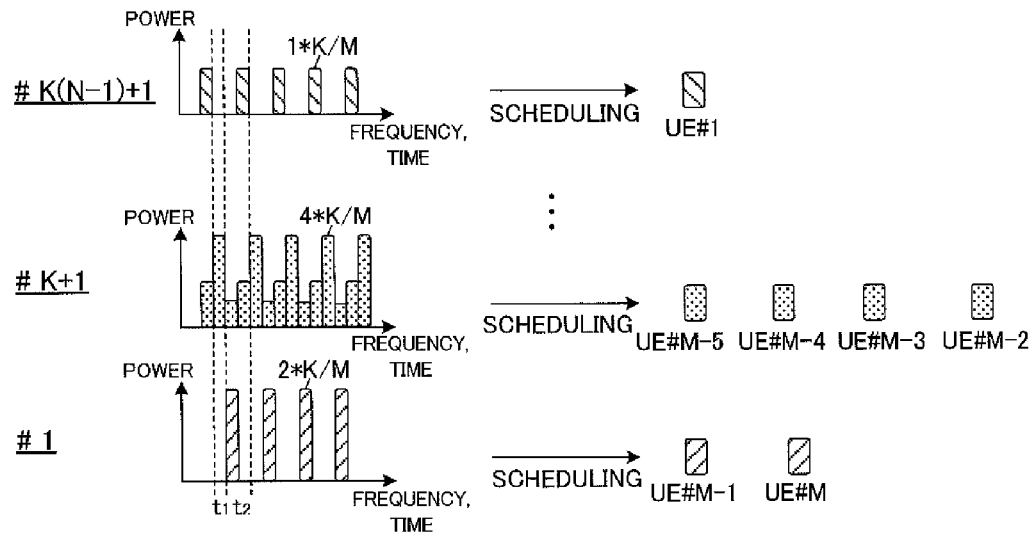
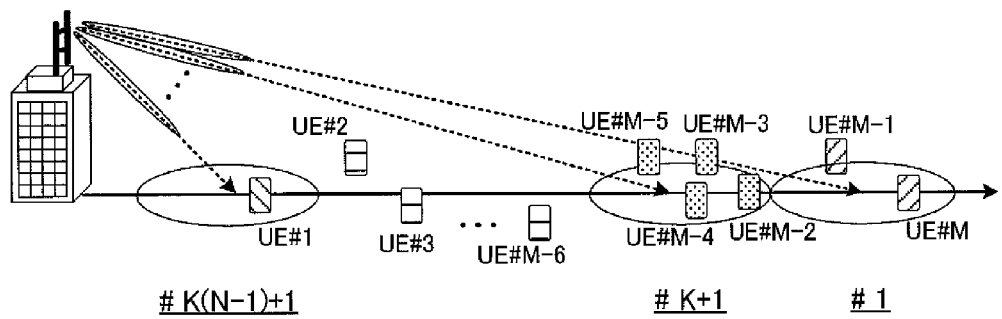
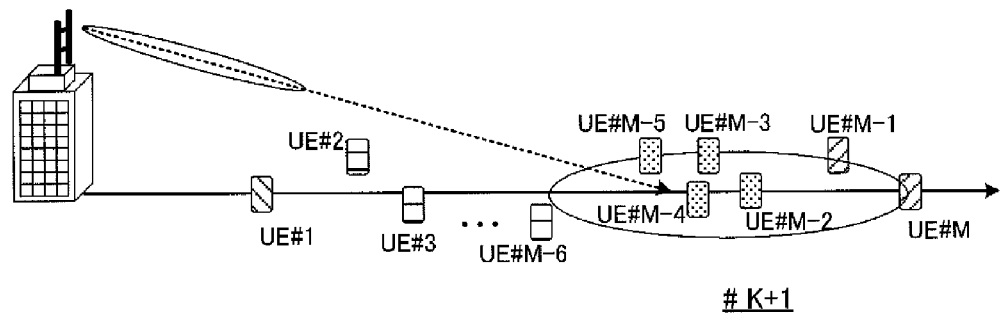
FIG.13

RADIO BASE STATION, RADIO COMMUNICATION SYSTEM AND RADIO COMMUNICATION METHOD

TECHNICAL FIELD

The present invention relates to a radio base station, a radio communication system and a radio communication method that are applicable to a next-generation mobile communication system.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on.

In a third-generation system, a transmission rate of maximum approximately 2 Mbps can be achieved on the downlink by using a fixed band of approximately 5 MHz. Meanwhile, in a system of the LTE scheme, it is possible to achieve a transmission rate of about maximum 300 Mbps on the downlink and about 75 Mbps on the uplink, by using a variable band which ranges from 1.4 MHz to 20 MHz. Furthermore, with the UMTS network, successor systems of LTE are also under study for the purpose of achieving further broadbandization and higher speed (for example, "LTE-Advanced" (LTE-A)). For example, in LTE-A, there is a plan to expand the maximum system band for LTE specifications, which is 20 MHz, to approximately 100 MHz.

Also, in a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that different transmission information sequences are transmitted from different transmitting antennas at the same time. Meanwhile, on the receiver side, taking advantage of the fact that fading variation is produced differently between the transmitting/receiving antennas, it is possible to increase the data rate (spectral efficiency) by separating and detecting the information sequences that have been transmitted at the same time.

Now, in recent years, vertical sectorization (VSEC) has been gaining popularity as a technique to secure communication capacity in a radio communication system. For example, a proposal has been made to improve the throughput of each cell by outputting a plurality of beams having varying beam angles (tilt angles) with respect to horizontal directions from an antenna apparatus, and setting the tilt angles of the beams in accordance with the conditions of radio base stations (see, for example, non-patent literature 2).

CITATION LIST

Non-Patent Literature

Non-Patent Literature 1: 3GPP TR 25.913 "Requirements for Evolved UTRA and Evolved UTRAN"

Non-patent literature 2: O. N. C. Yilmaz et al., "System Level Analysis of Vertical Sectorization for 3GPP LTE," Proc. of ISWCS, 2009.

SUMMARY OF INVENTION

Technical Problem

However, in VSEC, there is a threat that, due to the conditions in which radio base stations are provided and so on, differences are produced in the number of user terminals that are present, between a plurality of cells that are vertically sectorized, and as a result of this differences in each cell's communication capacity are produced. When the number of user terminals connected to each cell varies significantly, resources that can be allocated to one user terminal also differ significantly, which makes effective use of radio resources difficult.

The present invention has been made in view of the above, and it is therefore an object of the present invention to allow effective use of radio resources in VSEC to output a plurality of beams of varying tilt angles for sectorization in vertical directions.

Solution to Problem

The radio communication method of the present invention is a radio communication method for a radio base station that outputs a plurality of beams of varying tilt angles and forms a plurality of cells that are sectorized vertically, and a user terminal that establishes wireless connection with the radio base station, and this radio communication method provides the steps in which the radio base station acquires information about communication capacity of each of the plurality of cells, and controls a vertical plane beam width and/or transmission power of each cell and sets a coverage area of each cell such that differences in communication capacity between the plurality of cells are reduced.

Advantageous Effects of Invention

According to the present invention, it is possible to make effective use of radio resources in VSEC to output a plurality of beams of varying tilt angles for sectorization in vertical directions.

BRIEF DESCRIPTION OF DRAWINGS

FIG. 10 provides diagrams to show examples of resource allocation control for each cell based on the number of user terminals that are present in an inner cell and an outer cell;

FIG. 12 is a diagram to show examples of resource allocation control for each cell based on the number of user terminals that are present in each of a plurality of cells;

FIG. 13 is a diagram to show an example of a case where resources in each cell are controlled by controlling the increase/decrease of power in each cell and also by synchronizing the antenna gain, beam width or tilt angle between cells, in time, based on the number of user terminals that are present in each of a plurality of cells;

DESCRIPTION OF EMBODIMENTS

First, a case will be described where a radio base station outputs a plurality of beams with varying tilt angles via an antenna and forms a plurality of cells that are vertically sectorized. In the following description, a case of forming two cells and a case of forming three or more cells will be described. Where two cells are vertically sectorized, one will be referred to as the "inner cell," and the other one will be referred to as the "outer cell." Note that, with the present embodiment, the "tilt angle" refers to the angle of beams with respect to horizontal directions (for example, the ground). Also, with the present embodiment, dividing space into a plurality of sectors by means of a plurality of beams having varying tilt angles will be referred to as vertical sectorization, for ease of explanation. Note that the present inventors have proposed the method of controlling VSEC earlier in Japanese Patent Application No. 2011-177604.

Figure 1B:
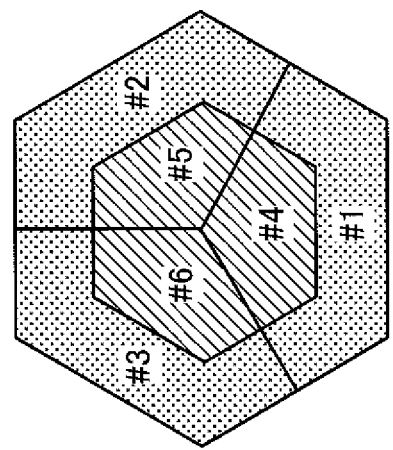
FIG. 1 provides diagrams to show two cells (an inner cell and an outer cell) that are vertically sectorized.
Figure 1A:
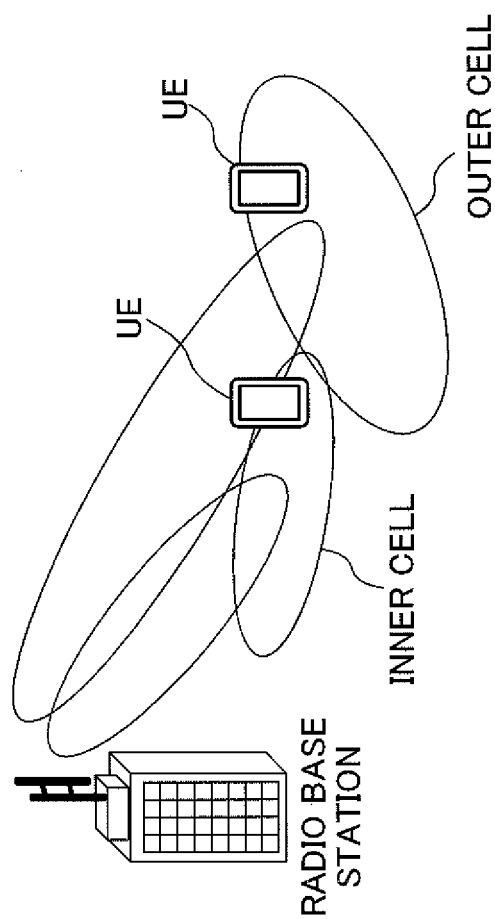
Figure 2B:
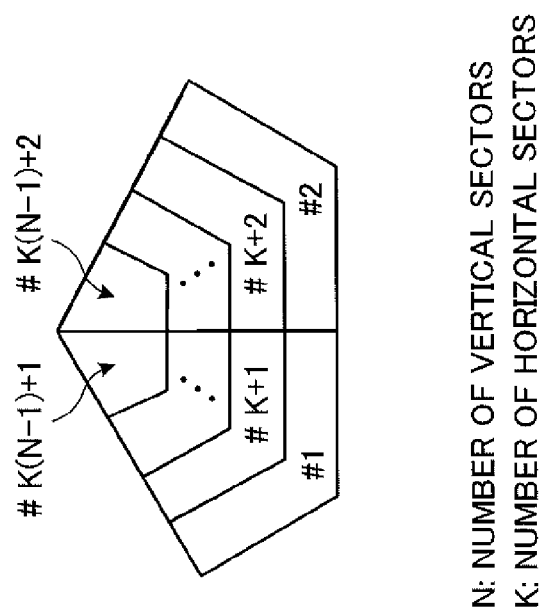
FIG. 2 provides diagrams to show a plurality of cells (three or more cells) that are vertically sectorized.
Figure 2A:
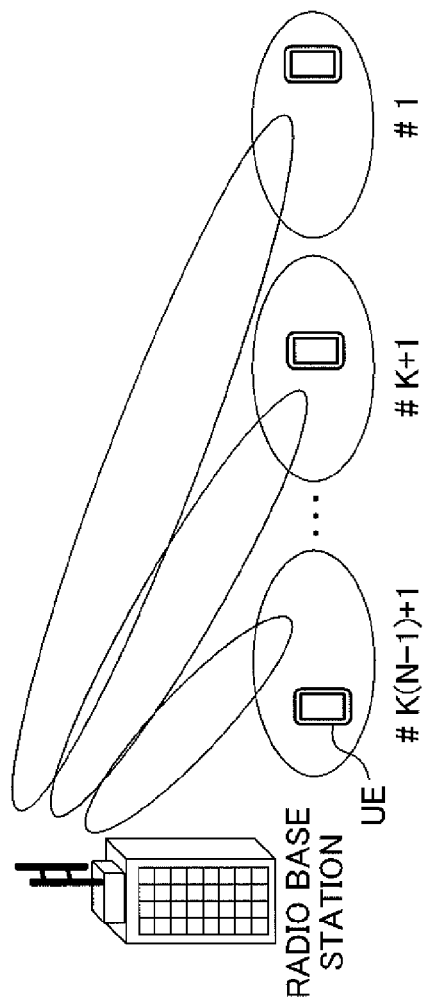

FIG. 1 and FIG. 2 show that a plurality of beams with varying tilt angles are output from one antenna and a plurality of cells are vertically sectorized. As shown in FIG. 1A, when two beams with mutually varying tilt angles are output, a cell (inner cell) that is relatively close to a radio base station and a cell (outer cell) that is relatively far are formed. The tilt angle of the beam forming the inner cell (inner tilt angle) is greater than the tilt angle of the beam forming the outer cell (outer tilt angle). Also, as shown in FIG. 2A, by increasing the number of beams having varying tilt angles, it is possible to increase the number of vertically sectorized cells.

Also, by outputting a plurality of beams having varying tilt angles with respect to varying horizontal directions, it is possible to form a plurality of cells that are vertically sectorized with respect to varying horizontal directions. For example, in a two-cell configuration, a plurality of inner cells (here, cell #4 to cell #6) and outer cells (here, cell #1 to cell #3) are formed (see FIG. 1B). Also, in a configuration with three or more cells, a plurality of cells that are vertically sectorized are formed (here, the vertical sectorization group of cell #1, cell #K+1, . . . , and cell #K (N−1)+1, and the vertical sectorization group of cell #2, cell #K+2, . . . and cell #K (N−1)+2) (see FIG. 2B). Note that, in FIG. 2, N is the number of vertical sectors, and K is the number of horizontal sectors.

A plurality of beams output from a radio base station may be output from one antenna or may be output from a plurality of antennas separately. Note that, although a case will be shown in the following description where a plurality of beams are output from one antenna, it is equally possible, with the present embodiment, to output beams of varying tilt angles from a plurality of (two or more) antennas.

As shown in FIG. 1 and FIG. 2, it is possible to improve the throughput of cells by forming multiple cells that are vertically sectorized, and by adequately setting the tilt angles of the beams forming each cell in accordance with the state of the radio base stations. However, even when the tilt angles of a plurality of cells are controlled in VSEC, cases might occur where, due to the conditions in which the radio base stations are provided and so on, the number of user terminals (or the number of active users) that are present in each cell varies significantly, and differences in communication capacity increase between cells. As a result, there is a threat that resources cannot be allocated evenly to the user terminals that are present in each cell, and it becomes not possible to make effective use of radio resources (the speed of communication decreases).

Figure 3:
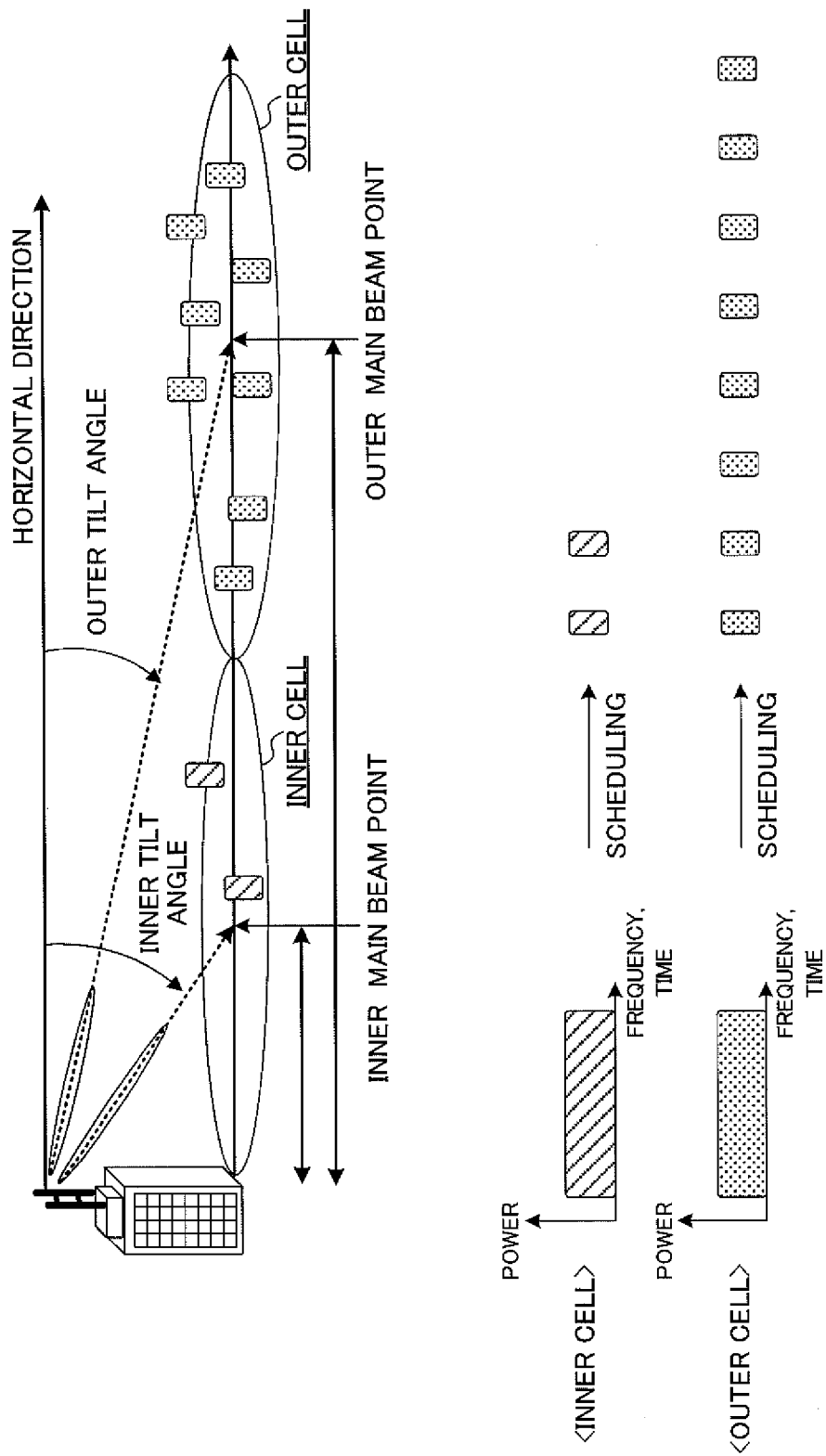
FIG. 3 is a diagram to show two cells (an inner cell and an outer cell) that are vertically sectorized, and resource allocation to user terminals that are present in the inner cell and the outer cell.

For example, as shown in FIG. 3, when the number of user terminals connected to the inner cell and the number of user terminals connected to the outer cell vary in proportion (that is, when the proportion of connecting user terminals varies), resources that can be allocated to one user terminal also vary between the inner cell and the outer cell. In FIG. 3, the number of user terminals that are present in the coverage area of the inner cell is two (the connecting proportion is 2/10), and the number of user terminals that are present in the coverage area of the outer cell is eight (the connecting proportion is 8/10).

When the amount of resources that can be allocated to user terminals is the same between the inner cell and the outer cell, the number of resources that can be allocated to one user terminal in the inner cell is greater than the number of resources that can be allocated to one user terminal in the outer cell. In this case, it may occur that resources to allocate to the user terminals of the inner cell are superabundant, and resources to allocate to the user terminals of the outer cell run short. As a result, it becomes difficult to make effective use of radio resources in the inner cell and the outer cell.

Figure 4:
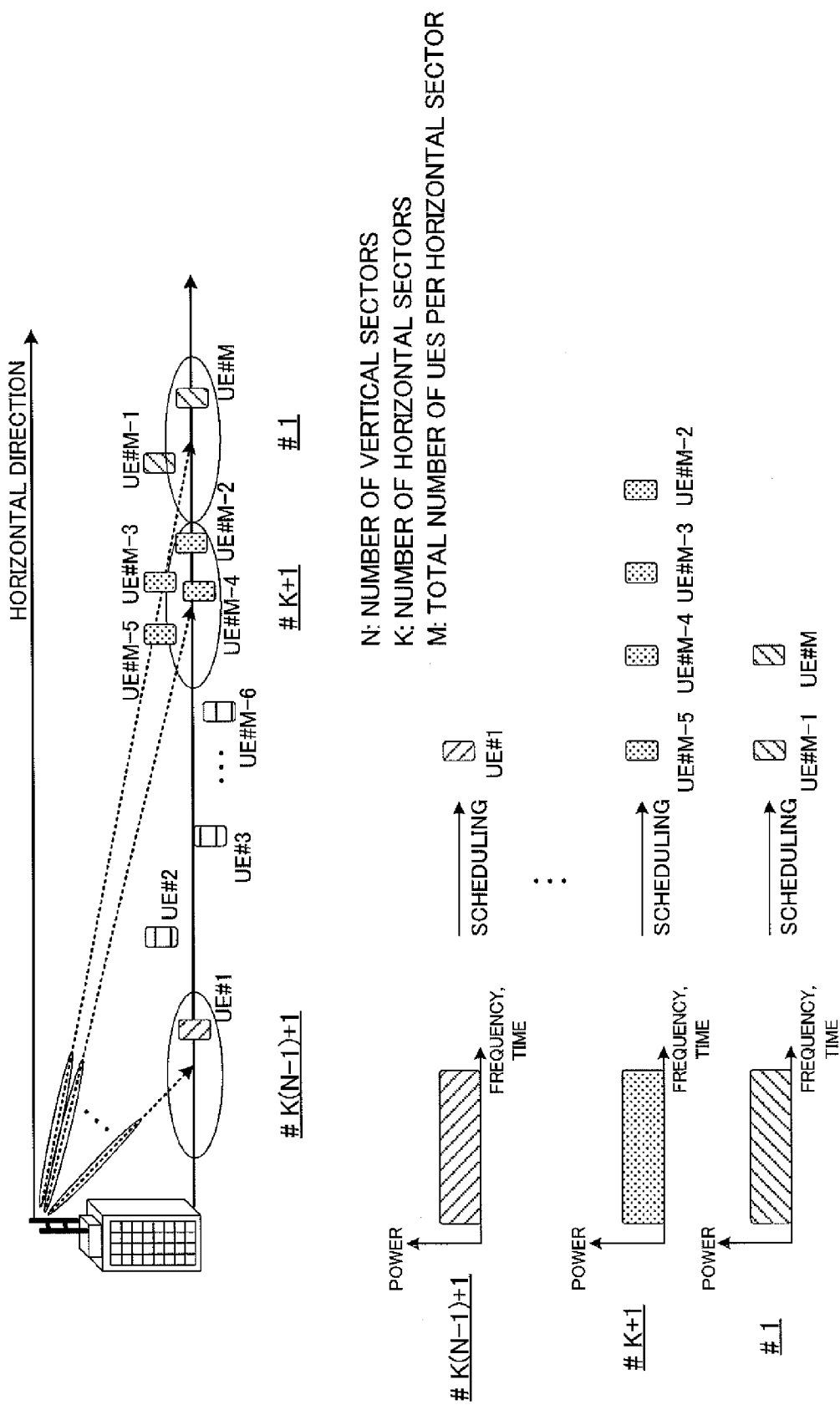
FIG. 4 is a diagram to show resource allocation to user terminals that are present in each of a plurality of cells that are vertically sectorized.

Similarly, as shown in FIG. 4, in cases where three or more cells are formed, when the proportion of the number of user terminals connected to each cell (the proportion of connecting user terminals) varies, differences are produced in resources that are available for allocation to one user terminal, and therefore differences in resources are produced between cells, and it becomes difficult to make effective use of radio resources. In FIG. 4, the number of user terminals that are present in the coverage area of the innermost cell (cell #K(N−1)+1) is one (the connecting proportion is 1/M), the number of user terminals that are present in the coverage area of the second outermost cell (cell #K+1) is four (the connecting proportion is 4/M), and the number of user terminals that are present in the coverage area of the outermost cell (cell #1) is two (the connecting proportion is 2/M). In this case, there is a threat that resources to allocate to the innermost cell (#K(N−1)+1) become superabundant, and resources to allocate to the user terminals in cell (cell #K+1) run short. Note that, in FIG. 4, N is the number of vertical sectors, K is the number of horizontal sectors, and M is the total number of user terminals per horizontal sector.

So, the present inventors have come up with the idea that it is possible to make effective use of radio resources in VSEC by changing the antenna gain, beam width and so on, on a per cell basis, and controlling coverage areas based on the communication capacity of each of a plurality of cells (for example, the number of user terminals that are present in each cell, the number of active users, or statistics of these), or by controlling the resources for each cell by controlling the increase/decrease of power in each cell or executing ON/OFF control, by synchronizing the antenna gain, beam width or tilt angle on a per cell basis.

Now, the method of controlling the coverage area of each cell and the method of controlling resource allocation when outputting a plurality of beams of varying tilt angles and vertically sectorizing a plurality of cells will be described below in detail. Note that, although, in the following description, a case will be shown in detail as an example where, in a two-cell configuration, the number of user terminals that are present in the coverage area of the inner cell is lower than the number of user terminals that are present in the coverage area of the outer cell, the present embodiment is by no means limited to this.

Also, although, in the following description, a case where the number of user terminals that are present in each cell is used as an evaluation indicator will described as an example of a case where each cell's coverage area control and resource allocation control are carried out based on each cell's communication capacity, the present embodiment is by no means limited to this. It is equally possible to design the coverage area control and resource allocation control for each cell by using, as evaluation indicators, the number of active users in each cell, the amount of resources consumed in each cell, the throughput of each cell, statistics given by statistically calculating and processing these, values given by mathematically calculating these based on design values, and values predicted from past statistics and system simulations, and so on.

(Coverage Area Control)

When the coverage areas of cells are controlled separately based on the number of user terminals that are present in each cell, a radio base station first acquires information about the number of user terminals present in each cell. This information is converted into data of the proportion of connecting user terminals per cell (the number of user terminals connected to each cell/the total number of user terminals connected to all cells). Information about the number of user terminals that are present in each cell can be acquired, for example, from system information that is output from the network side.

Also, besides actually counting the number of user terminals that are connected to each cell and perform radio communication, the number of user terminals connected to each cell can be determined in various other methods. For example, the number of user terminals present in each cell may be calculated based on the assumption that the user terminals are distributed uniformly over the area where each cell is formed. In this case, the number of user terminals that are connected to each cell is calculated depending on the area of each cell.

Also, it is equally possible to apply, as information about the number of user terminals, statistics given by calculating and processing the number of user terminals statistically, values given by calculating the number of user terminals taking into account the conditions of design of the radio base stations (for example, the place where each cell is formed, and so on), or values given by predicting the number of user terminals from past statistics, system simulations and so on. The conditions in which radio base stations are provided match the surrounding environment such as the positions where the radio base stations are provided (the height, place and so on), the place where each cell is formed, and so on.

Based on the acquired information about the proportion of connecting user terminals in each cell, the radio base station sets each cell's coverage area conditions (for example, the size of the coverage area) such that differences in the proportion of user terminals connected to each cell are reduced. For example, when the proportion of connecting user terminals in a given cell is lower than the average value of the proportions of connecting user terminals of all cells (that is, the reciprocal of the number of all cells, which is 1/2 in a two-cell configuration), conditions to increase the coverage size are set, and when the proportion of connecting user terminals in a given cell is higher than the average value of the proportions of connecting user terminals of all cells (that is, the reciprocal of the number of all cells, which is 1/2 in a two-cell configuration), conditions to reduce the coverage size are set.

Then, based on the coverage area conditions, the conditions of beams to form each cell (for example, the tilt angle of each cell, the transmission power of each cell, the antenna gain of each cell, the vertical plane beam width of each cell (HPBW: half-power bandwidth)) are determined, and the size and position of each cell's coverage area are changed in accordance with the proportion of connecting user terminals. Now, a case of controlling the vertical plane beam width of each cell and the transmission power of each cell will be described below with reference to the accompanying drawings. Note that, in the following description, a cell where the proportion of connecting user terminals is lower than the average value of the proportions of connecting user terminals of all cells (that is, the reciprocal of the number of all cells, which is 1/2 in a two-cell configuration) will be defined as a "cell where the proportion of connecting user terminals is low," and a cell where the proportion of connecting user terminals is higher than the average value of the proportions of connecting user terminals of all cells (that is, the reciprocal of the number of all cells, which is 1/2 in a two-cell configuration) will be defined as a "cell where the proportion of connecting user terminals is high."

<Vertical Plane Beam Width Control>

Figure 5:
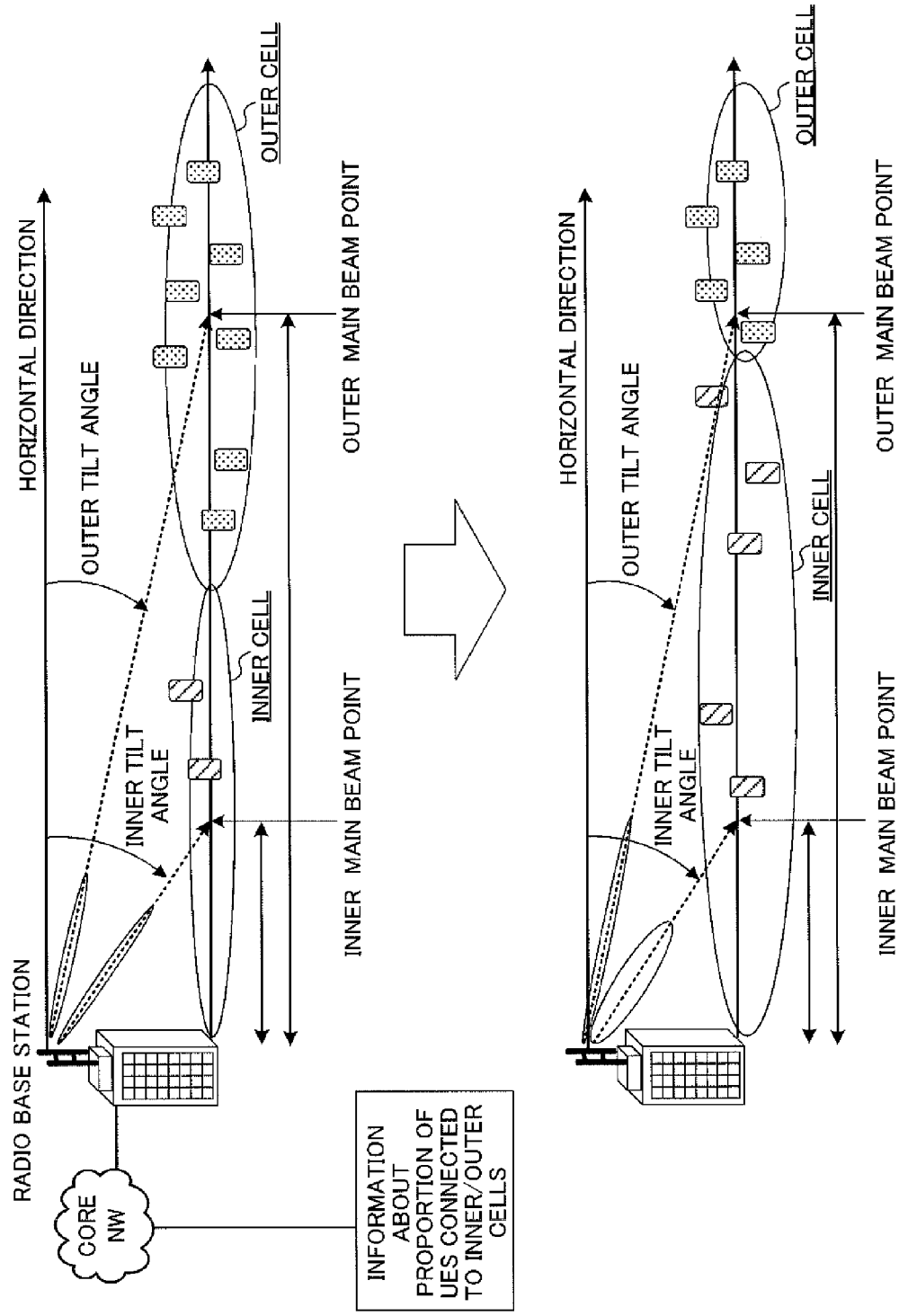
FIG. 5 is a diagram to show an example of a case where the coverage areas of an inner cell and an outer cell are controlled by changing the vertical plane beam width.

When the coverage area of each cell is controlled by changing the vertical plane beam width, the radio base station narrows the vertical plane beam width in cells where the proportion of connecting user terminals is high, in accordance with the proportion of connecting user terminals, and widens the vertical plane beam width of cells where the proportion of connecting user terminals is low, in accordance with the proportion of connecting user terminals (see FIG. 5). To be more specific, the radio base station determines the offset values of the vertical plane beam widths of the beams forming each cell, based on the proportion of connecting user terminals in each cell, on a per cell basis. Then, based on the determined offset values, weights (phase and amplitude) to apply to the antenna section are generated, and the vertical plane beam widths of the beams to output are changed by multiplying the transmission signals by the weights.

In this way, by reducing the coverage area of cells where the proportion of connecting user terminals is high in accordance with the proportion of connecting user terminals, and by broadening the coverage area of cells where the proportion of connecting user terminals is low in accordance with the proportion of connecting user terminals, differences in the proportion of connecting user terminals in each cell are reduced. In other words, it is possible to make the number of user terminals present in each cell substantially equal.

FIG. 5 shows, for example, a case of control in a two-cell configuration, and a case where a user terminal connected to an outer cell is connected to an inner cell by widening the vertical plane beam width of the inner cell in accordance with the proportion of connecting user terminals and by narrowing the vertical plane beam width of the outer cell in accordance with the proportion of connecting user terminals. In this way, by controlling the vertical plane beam width of each cell based on the proportion of connecting user terminals in each cell, the proportion of connecting user terminals becomes even between cells, and therefore it is possible to allocate resources to the user terminals in each cell evenly. As a result, it is possible to use radio resources without unevenness between user terminals.

Also, in a predetermined period of time after changing the coverage area of each cell, the radio base station can repeat the process of re-acquiring information about the number of user terminals present in each cell and re-setting the coverage areas by changing the vertical plane beam width of each cell in the same way as described above. By repeating the process of setting the coverage areas of cells, it is possible to make the differences in the number of user terminals between cells even smaller, and allow optimization so that radio resources are used without unevenness between user terminals. Alternatively, it is also possible to count active users on a real-time basis, and, in accordance with this, allow optimization so that radio resources are used without unevenness between user terminals.

Note that, as for the vertical plane beam width offset values, it is possible to prepare various combinations of amounts of offset in a database and determine predetermined offset values in accordance with the proportion of connecting user terminal in each cell. The database in which amounts of offset are defined can be prepared based on information that is acquired earlier in other radio base stations, values calculated based on simulation, and so on.

Also, with the present embodiment, the radio base station may control the coverage areas of cells not only by changing the vertical plane beam width but also by changing the horizontal plane beam width. In this case, it is possible to provide vertical arrays and horizontal arrays as antenna elements, and multiply transmission signals by vertical weights and horizontal weights.

<Power Offset Control>

Figure 6:
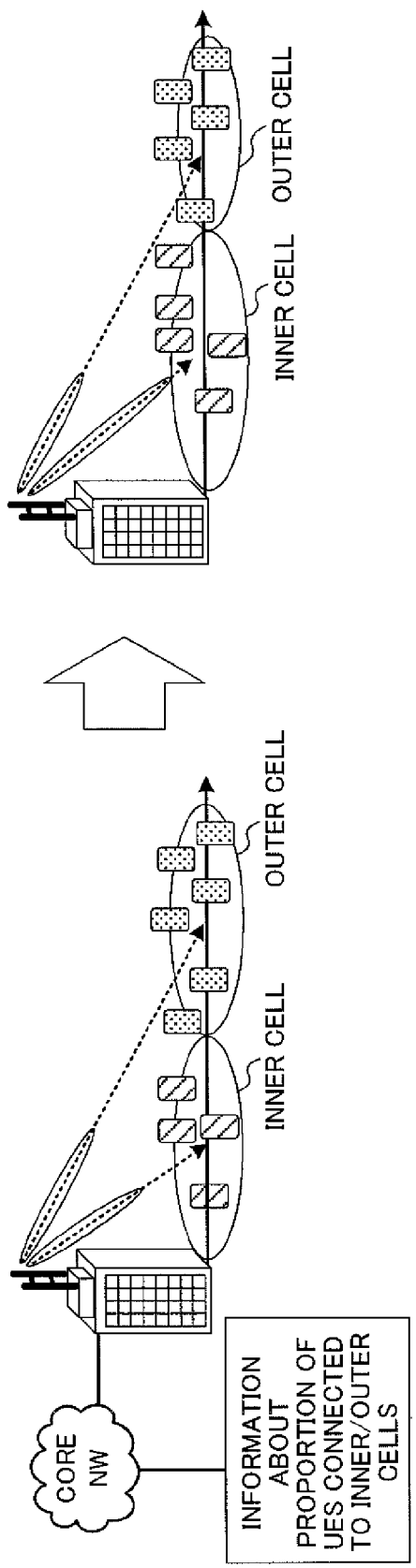
FIG. 6 is a diagram to show an example of a case where the coverage areas of an inner cell and an outer cell are controlled by changing transmission power.

When the coverage area of each cell is controlled by changing transmission power (power), the radio base station lowers the transmission power of cells where the proportion of connecting user terminals is high in accordance with the proportion of connecting user terminals, and increases the transmission power of cells where the proportion of connecting user terminals is low in accordance with the proportion of connecting user terminals (see FIG. 6). To be more specific, the radio base station determines the transmission power offset value for each cell based on the proportion of connecting user terminals in each cell. Then, the input signals to each beam are changed on the basis of the determined offset value.

FIG. 6 shows, as an example, a case of control in a two-cell configuration, where a user terminal connected to an outer cell is connected to an inner cell by increasing the transmission power of the inner cell in accordance with the proportion of connecting user terminals, and by lowering the transmission power of the outer cell in accordance with the proportion of connecting user terminals. In this way, by controlling the transmission power of each cell based on the proportion of connecting user terminals in each cell, the proportion of connecting user terminals becomes even between cells, so that it is possible to allocate resources to user terminals in each cell evenly. As a result, it is possible to use radio resources without unevenness between user terminals.

Also, in a predetermined period of time after changing the coverage area of each cell, the radio base station can re-acquire information about the number of user terminals present in each cell, and change the transmission power of each cell in the same way as described above. By repeating the process of re-setting the coverage areas, it is possible to reduce the differences in the number of user terminals between cells and allow optimization so that radio resources are used without unevenness between user terminals. Alternatively, it is equally possible to count active users on a real-time basis, and, in accordance with this, allow optimization so that radio resources are used without unevenness between user terminals.

Note that, as for the transmission power offset values, it is possible to prepare various combinations of amounts of offset in a database, and determine predetermined offset values in accordance with the proportion of connecting user terminals in each cell. The database in which amounts of offset are defined can be prepared based on information that is acquired earlier in other radio base stations, values calculated based on simulation, and so on.

As has been described above with reference to FIG. 5 and FIG. 6, by controlling the vertical plane beam width and/or transmission power of each cell based on the proportion of connecting user terminals in each cell, it is possible to reduce the differences in the proportion of connecting user terminals in each cell and allow more effective use of radio resources.

Figure 7:
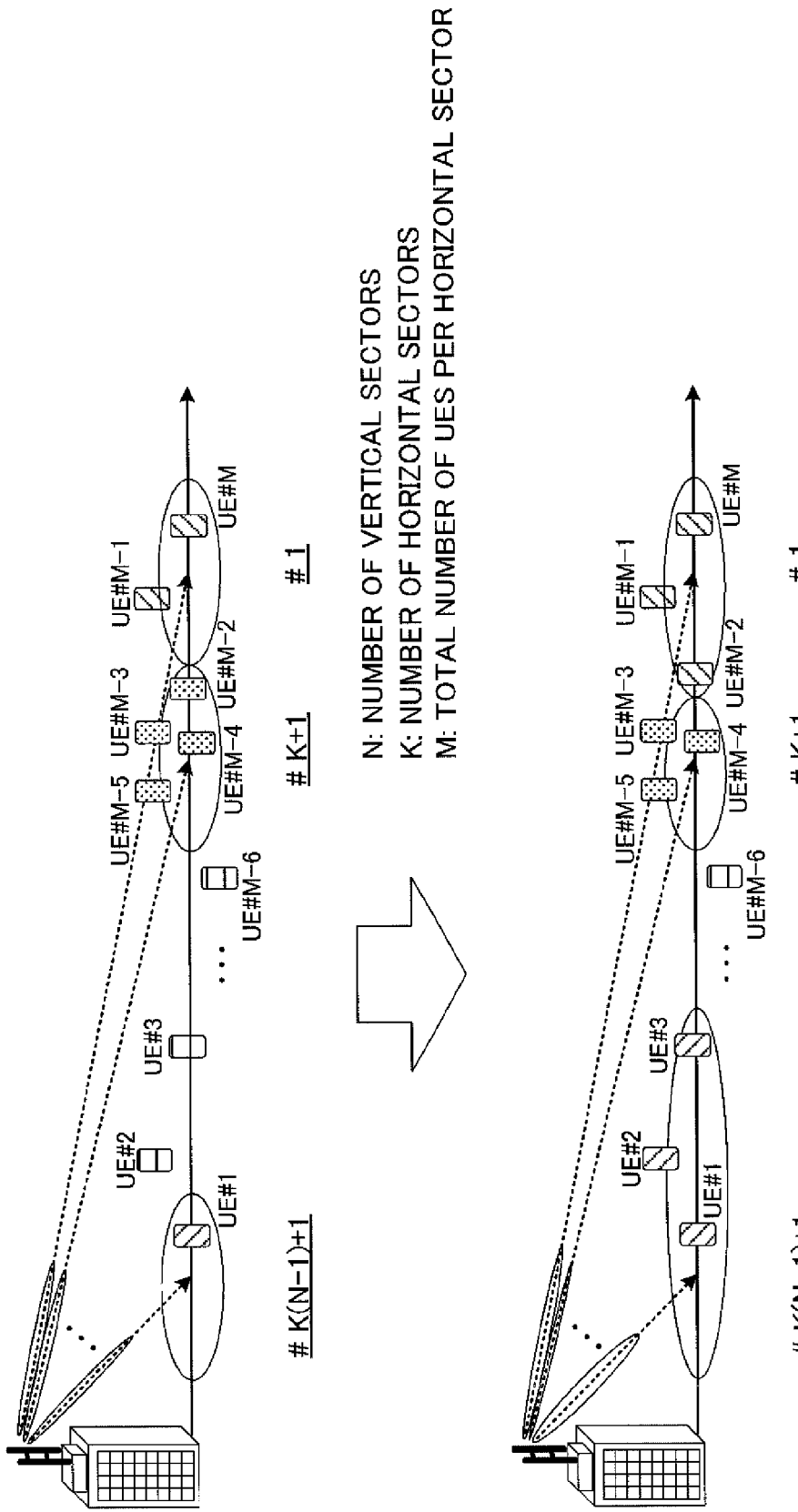
FIG. 7 is a diagram to show an example of a case where the coverage areas of a plurality of cells (three or more cells) are controlled by changing the vertical plane beam width and/or transmission power.

Note that, even when three or more cells are vertically sectorized, similar to the case of two cells, it is possible to control the vertical plane beam width and/or transmission power of each cell based on the proportion of connecting user terminals in each cell. FIG. 7 shows an example of control where the number of vertical sectors is N and the number of horizontal sectors is K (for example, the case of FIG. 2B). In FIG. 7, the vertical plane beam width and/or transmission power are controlled so that the coverage areas of cells where the proportion of connecting user terminals is low (#K(N−1)+1 and #1) become bigger, and the vertical plane beam width and/or transmission power are controlled so that the coverage area of a cell where the proportion of connecting user terminals is high (cell #K+1) becomes smaller. By this means, it is possible to reduce the differences in the proportion of connecting user terminals in each cell, and allow more effective use of radio resources.

Next, the method of controlling the resource allocation to each cell based on the proportion of connecting user terminals in each cell will be described.

(Resource Allocation Control)

When the resource allocation for each cell is controlled based on the number of user terminals that are present in each cell, the radio base station first acquires information about the number of user terminals that are present in each cell. This information is converted into data of the proportion of user terminals connected to each cell (the number of user terminals connected to each cell/the total number of user terminals in all cells). The information about the proportion of connecting user terminals is acquired in various methods such as ones described above.

The radio base station changes the amount of (power) resources to allocate to each cell in accordance with the acquired information about the proportion of connecting user terminals. To be more specific, the amount of (power) resources to allocate to cells where the proportion of connecting user terminals is low is set low in accordance with the proportion of connecting user terminals. The amount of (power) resources to allocate to cells where the proportion of connecting user terminals is high is set large in accordance with the proportion of connecting user terminals. The radio base station outputs the beams to form each cell and allocate resources to the user terminals present in each cell based on the conditions of the amount of (power) resources to allocate to each cell.

Figure 8:
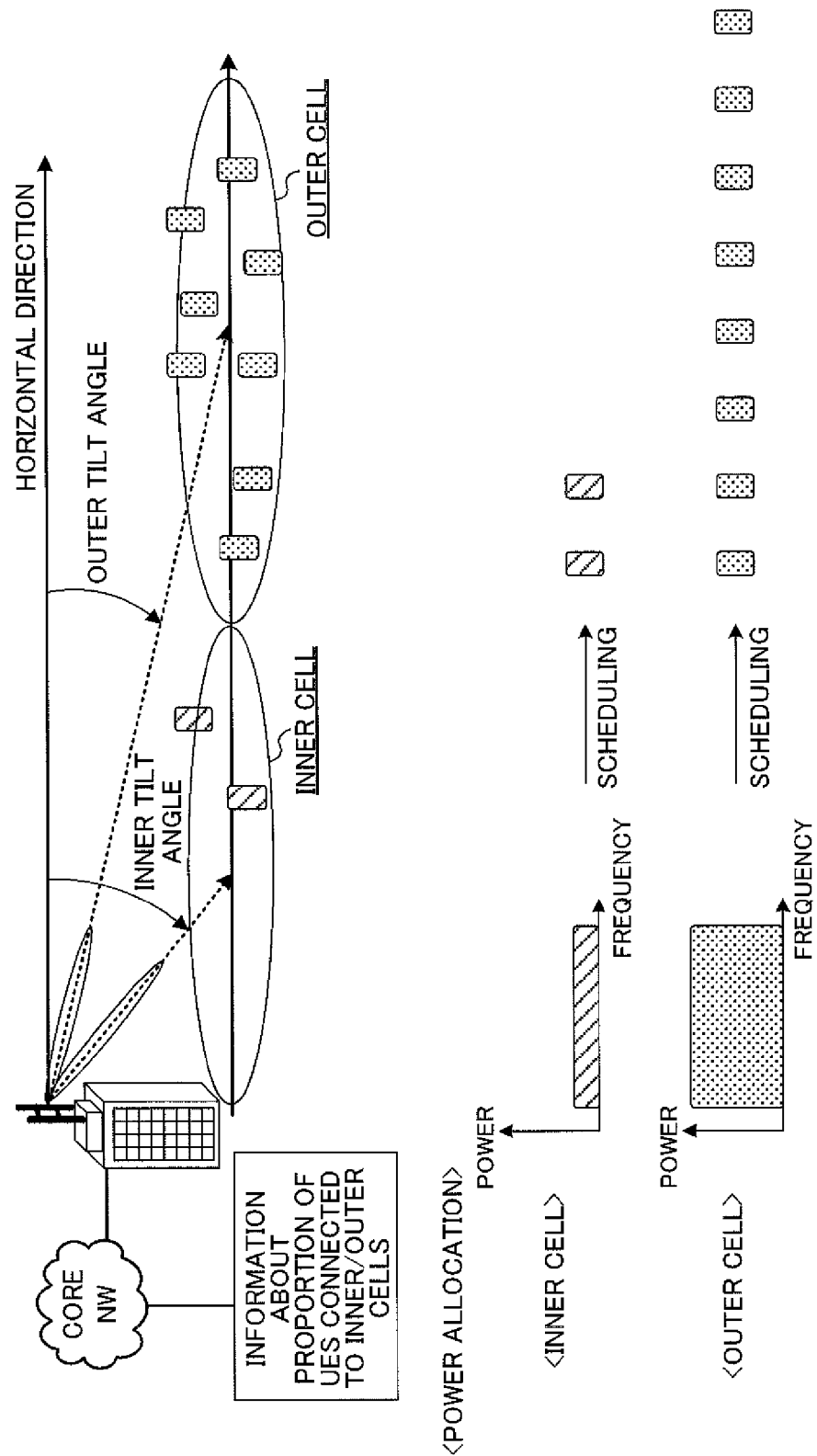
FIG. 8 is a diagram to show an example of power resource allocation control for each cell based on the number of user terminals that are present in an inner cell and an outer cell.

FIG. 8 shows, as an example, an example of control in a two-cell configuration, and a case where the radio base station reduces the amount of (power) resources to allocate to a cell where the proportion of connecting user terminals is low, and increases the amount of (power) resources to allocate to a cell where the proportion of connecting user terminals is high. By this means, the amount of (power) resources in each cell is determined in accordance with the proportion of connecting user terminals, it is possible to control the amount of (power) resources to allocate per user terminal in each cell is controlled to be equal. By this means, it is possible to allow optimization so that radio resources are used without unevenness between user terminals.

Figure 9:
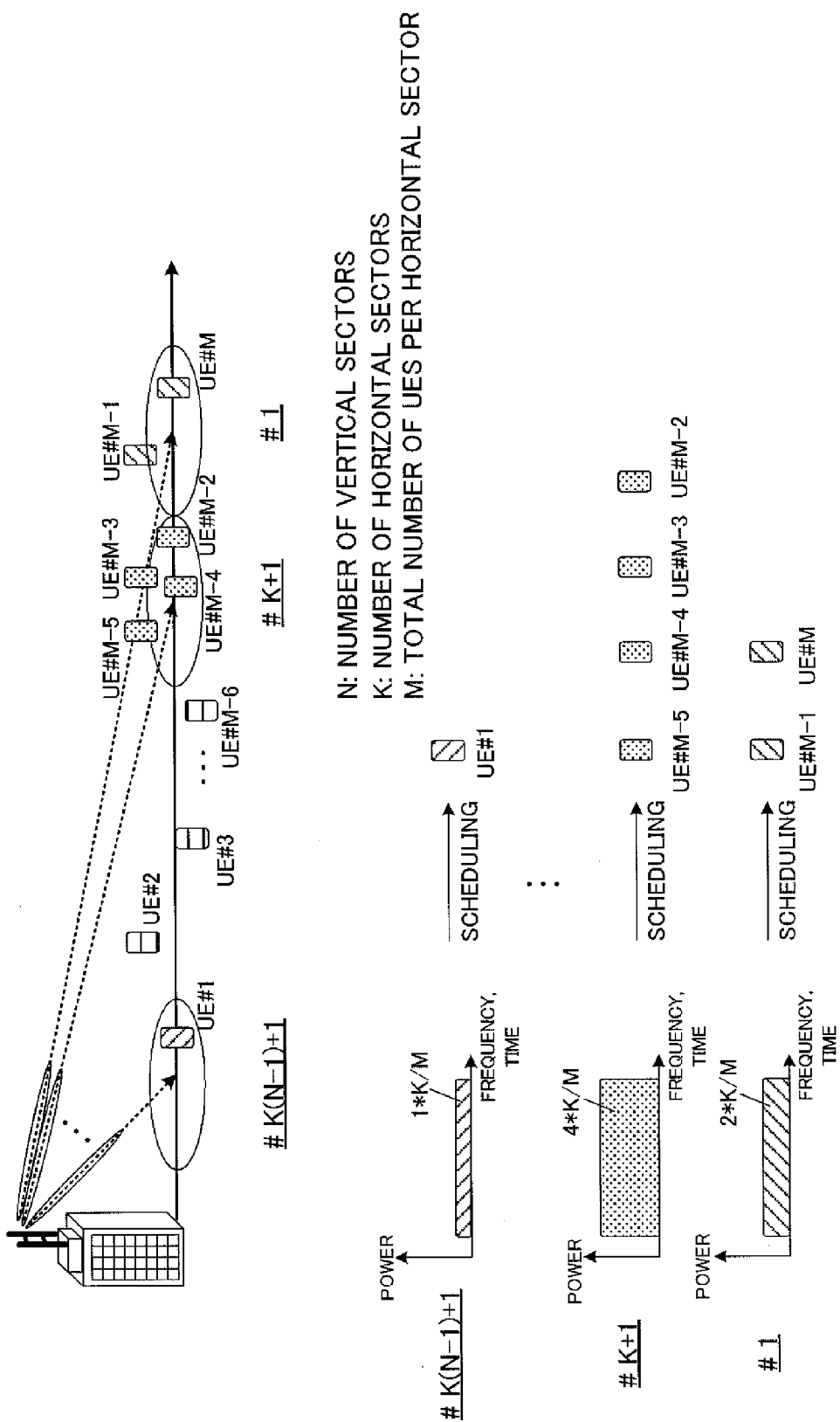
FIG. 9 is a diagram to show an example of power resource allocation control for each cell based on the number of user terminals that are present in each of a plurality of cells.

Also, as shown in FIG. 9, even when three or more cells are vertically sectorized, it is possible to control the amount of (power) resources to allocate to each cell in accordance with the proportion of connecting user terminals. FIG. 9 shows a case where the amount of (power) resources to allocate to each cell is controlled in proportion with the proportion of connecting user terminals (a case where 1×K/M is allocated to cell #K(N−1)+1, 4×K/M is allocated to cell #K+1, and 2×K/M is allocated to cell #1).

Although a case has been described above where, when allocating (power) resources, the allocation of power is changed in accordance with the proportion of connecting user terminals, this is by no means limiting. Besides, the frequency band may be divided and resources may be allocated in accordance with the proportion of connecting user terminals, or time may be divided and resources to match the proportion of connecting user terminals may be allocated, or, it is equally possible to combine these and allocate resources to match the proportion of connecting user terminals, so that it is possible to allow optimization in which radio resources are used without unevenness between user terminals.

FIG. 10 shows, an example of control in a two-cell configuration, and shows an example of resource allocation control for a cell where the proportion of connecting user terminals is low and a cell where the proportion of connecting user terminals is high. FIG. 10A shows a state before the resource allocation control. FIG. 10B shows a case where allocation is controlled in the frequency domain (frequency allocation control). In this case, resources are allocated to the cell where the proportion of connecting user terminals is low (the inner cell in FIG. 10), limited to a frequency range narrower than before the resource allocation control is executed, in accordance with the proportion of connecting user terminals. Meanwhile, to the cell where the proportion of connecting user terminals is high (the outer cell in FIG. 10), resources are allocated by using a wider frequency range than before the resource allocation control, in accordance with the proportion of connecting user terminals.

FIG. 10C shows a case where allocation is controlled in the time domain. In this case, in accordance with the proportion of connecting user terminals, to the cell where the proportion of connecting user terminals is low (the inner cell in FIG. 10), the time period to allocate resources is made smaller than before the resource allocation control. On the other hand, in accordance with the proportion of connecting user terminals, to the cell where the proportion of connecting user terminals is high (the outer cell in FIG. 10), the time period to allocate resources is made larger than before the resource allocation control (time allocation control).

Figure 11:
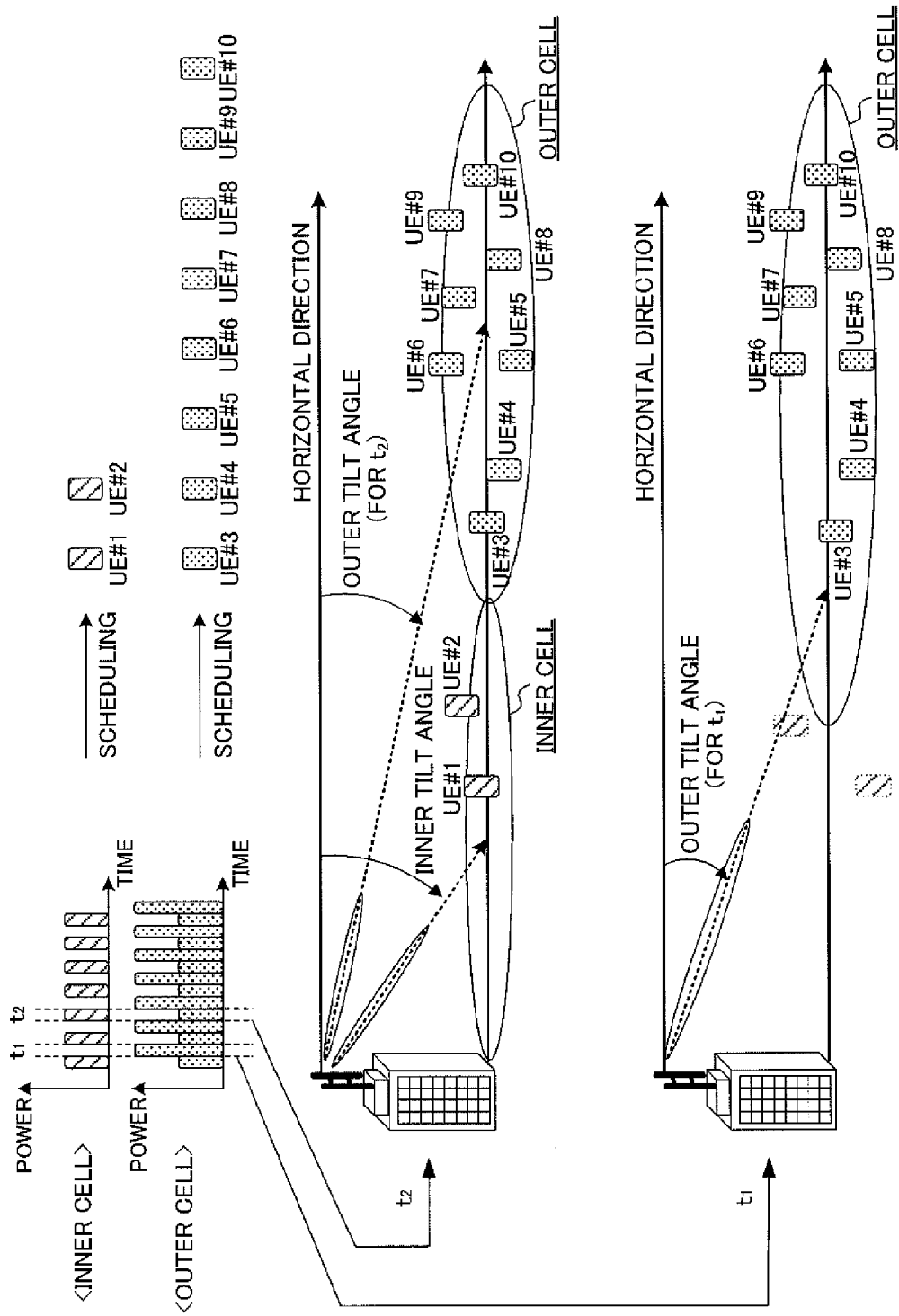
FIG. 11 is a diagram to show an example of a case where resources in each cell are controlled by controlling the increase/decrease of power in each cell and also by synchronizing the antenna gain, beam width or tilt angle between cells, in time, based on the number of user terminals that are present in an inner cell and an outer cell.

To be more specific, as shown in FIG. 10C and FIG. 11, a time period $t_1$, in which resources are allocated to the cell where the proportion of connecting user terminals is high (the outer cell in FIG. 10 and FIG. 11), and in which resources are not allocated to the cell where the proportion of connecting user terminals is low (the inner cell in FIG. 10 and FIG. 11), is provided periodically. Also, in this time period $t_1$, it is preferable to increase the transmission power relatively in the cell where the proportion of connecting user terminals is high.

For example, as shown in FIG. 11, when user terminals (UE #1 and UE #2) are present in the inner cell and user terminals (UE #3 to UE #10) are present in the outer cell, in time period $t_1$, resources are allocated selectively to the cell where the proportion of connecting user terminals is high (the outer cell in FIG. 11), and also the power is increased. By this means, in time period $t_1$, interference from the cell where the proportion of connecting user terminals is low against the cell where the proportion of connecting user terminals is high is reduced, and furthermore it is possible to allocate more resources to the cell where the proportion of connecting user terminals is high. Also, in the radio base station, it is preferable to allocate resources to a user terminal located on a cell edge (in FIG. 11, UE #3) in time period $t_1$ where there is no influence of interference from the inner cell.

Also, when three or more cells are vertically sectorized, it is possible to execute frequency allocation control and time allocation control in accordance with the proportion of connecting user terminals. FIG. 12 shows a case where frequency allocation control and time allocation control are executed in accordance with the proportion of connecting user terminals (a case where 1×K/Ms is allocated to cell #K(N−1)+1, 4×K/M is allocated to cell #K+1, and 2×K/M is allocated to cell #1). In the time allocation control shown in FIG. 12, time period $t_1$, in which resources are not allocated to cell #K+1 and cell #1 and in which resources are allocated selectively to cell #K(N−1)+1, is provided.

Also, in time period $t_1$, in which resources are allocated selectively to the cell where the proportion of connecting user terminals is high, resources are not allocated to the cell where the proportion of connecting user terminals is low. Consequently, in time period $t_1$, it is also possible to change the tilt angles, vertical plane beam widths and/or antenna gains of the cells such that the coverage area of the cell where the proportion of connecting user terminals is high overlaps the coverage area of the cell where the connecting proportion is low (see FIG. 11).

In this case, control is designed such that the coverage area of the cell where the proportion of connecting user terminals is high (the outer cell in FIG. 11) expands in the direction toward the coverage area of another cell formed in time period $t_2$ apart from time period $t_1$ (which, in FIG. 11, is the inner cell where the proportion of connecting user terminals is low). To be more specific, the radio base station apparatus changes the tilt angles, vertical plane beam widths and/or antenna gains of the beam to form the cell where the proportion of connecting user terminals is high (for example, in the case of a two-cell configuration, increases the tilt angle of the outer cell). By this means, it is possible to reduce interference against other cells that neighbor the cell where the beam is changed. Also, it is possible to improve communication quality for user terminals (in FIG. 11, UE #3) that are located on the cell edge of the cell where the connecting proportion is high, and located in positions close to the cell where the proportion of connecting user terminals is low.

Also, as shown in FIG. 13, when three or more cells are vertically sectorized, it is possible to change the coverage area of a cell where the proportion of connecting user terminals is high to overlap the coverage area of a cell where the connecting proportion is low, in time period $t_1$. In FIG. 13, in time period $t_1$, in which resources are allocated selectively to the cell where the proportion of connecting user terminals is high (cell #K+1), control is designed so that the coverage area of cell #K(N−1)+1 expands in the direction of the coverage area of cell #1. At this time, a user terminal located on a cell edge (UE #M−2 in FIG. 13) is not influenced by cell #1, so that it is preferable to allocate resources to this user terminal.

<Range Expansion>

Figure 14:
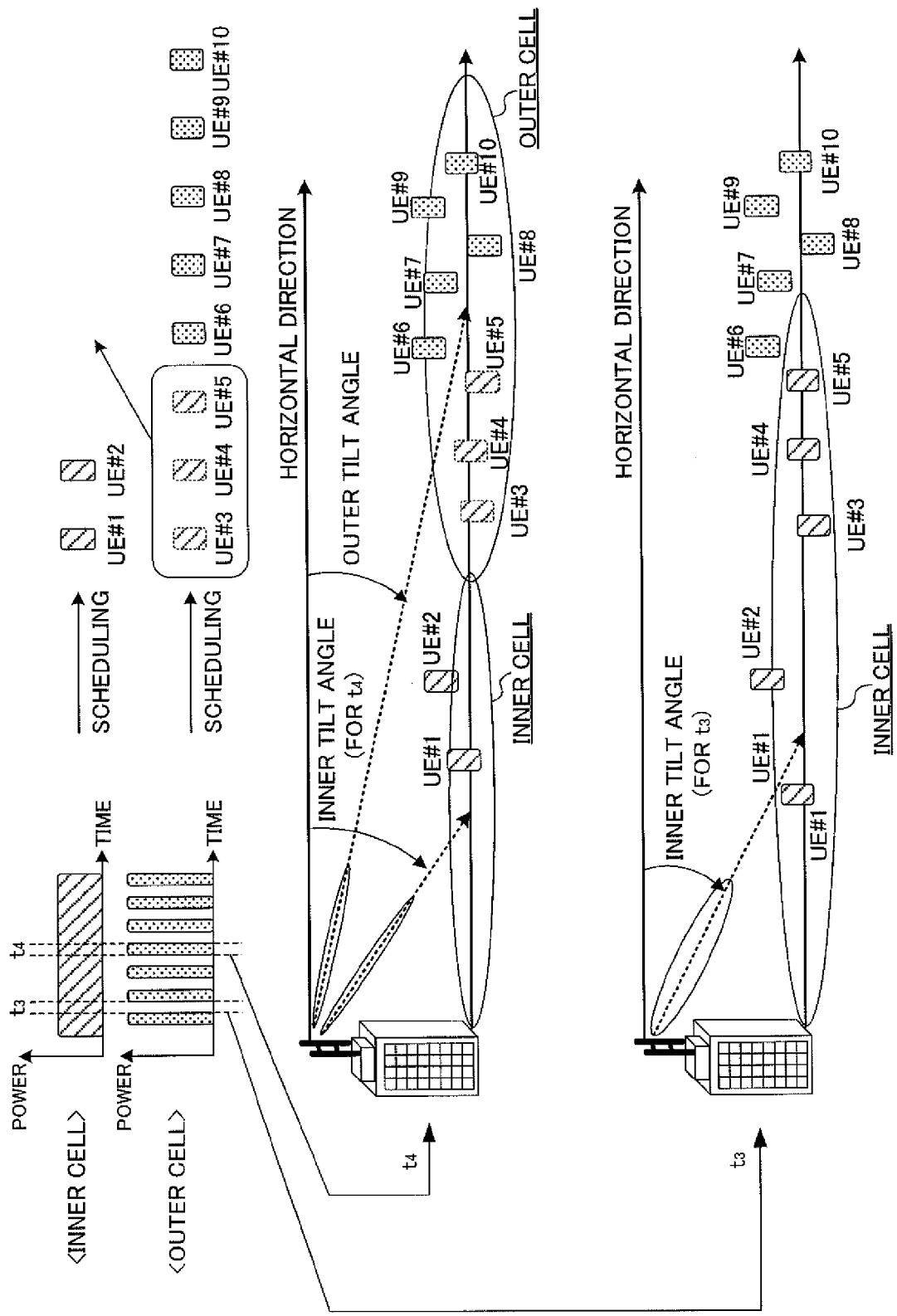
FIG. 14 is a diagram to show an example of a case where resources in each cell are controlled by executing ON/OFF control of each cell and also by synchronizing the antenna gain, beam width or tilt angle between cells, in time, based on the number of user terminals that are present in an inner cell and an outer cell, and the coverage area of one cell is expanded.

Also, with the present embodiment, it is possible to design control to reduce the differences in the proportion of connecting user terminals in each cell by controlling resource allocation and expanding the coverage areas based on the proportion of connecting user terminals in each cell. FIG. 14 shows a case to provide time period $t_3$, in which the radio base station selectively allocates resources to a cell where the proportion of connecting user terminals is low (the inner cell in FIG. 14), and expands the coverage area of a cell where the proportion of connecting user terminals is low in this time period $t_3$ (range expansion).

The radio base station acquires information about the proportion of connecting user terminals in each cell. Also, the radio base station selects, from among the user terminals that are present in the coverage area of a cell where the proportion of connecting user terminals is high (for example, the outer cell in the two-cell configuration of FIG. 14) (UEs #3 to #10), predetermined user terminals (in FIG. 14, UEs #3 to #5) that can connect with a cell where the proportion of connecting user terminals is low (for example, the inner cell in the two-cell configuration of FIG. 14) with predetermined quality or above.

Also, time period $t_3$ is periodically provided, in which the radio base station allocates resources to the cell where the proportion of connecting user terminals is low and does not allocate resources to the cell where the proportion of connecting user terminals is high. Furthermore, in this time period $t_3$, the radio base station connects predetermined user terminals (UEs #3 to #5) to the cell where the proportion of connecting user terminals is low, and allocates resources from the cell where the proportion of connecting user terminals is low. In this way, by controlling the allocation of resources and furthermore expanding the coverage area of a cell where the proportion of connecting user terminals is low, it is possible to reduce the influence of interference from a cell where the proportion of connecting user terminals is high, against predetermined user terminals (UEs #3 to #5) and also allocate resources evenly to the user terminals that are present in each cell.

Also, in time period $t_3$, in which resources are allocated selectively to a cell where the proportion of connecting user terminals is low, the coverage area of the cell where the proportion of connecting user terminals is low may be changed. For example, in a time period to allocate resources selectively to the cell where the proportion of connecting user terminals is low, it is possible to change the tilt angle and/or the vertical plane beam width of the beam to form the cell where the proportion of connecting user terminals is low such that the coverage area of the cell where the proportion of connecting user terminals is low expands in the direction of the coverage area of a cell where the proportion of connecting user terminals is high, formed in time period $t_4$ apart from this time period $t_3$.

In this case, in time period $t_3$ in which resources are selectively allocated to the cell where the proportion of connecting user terminals is low, it is possible to reduce interference against other cells that neighbor the cell where the proportion of connecting user terminals is low, and also improve communication quality for predetermined user terminals (UEs #3 to #5). Also, it becomes possible to allocate resources to the user terminals in each cell more evenly, so that effective use of radio resources is made possible.

Figure 15:
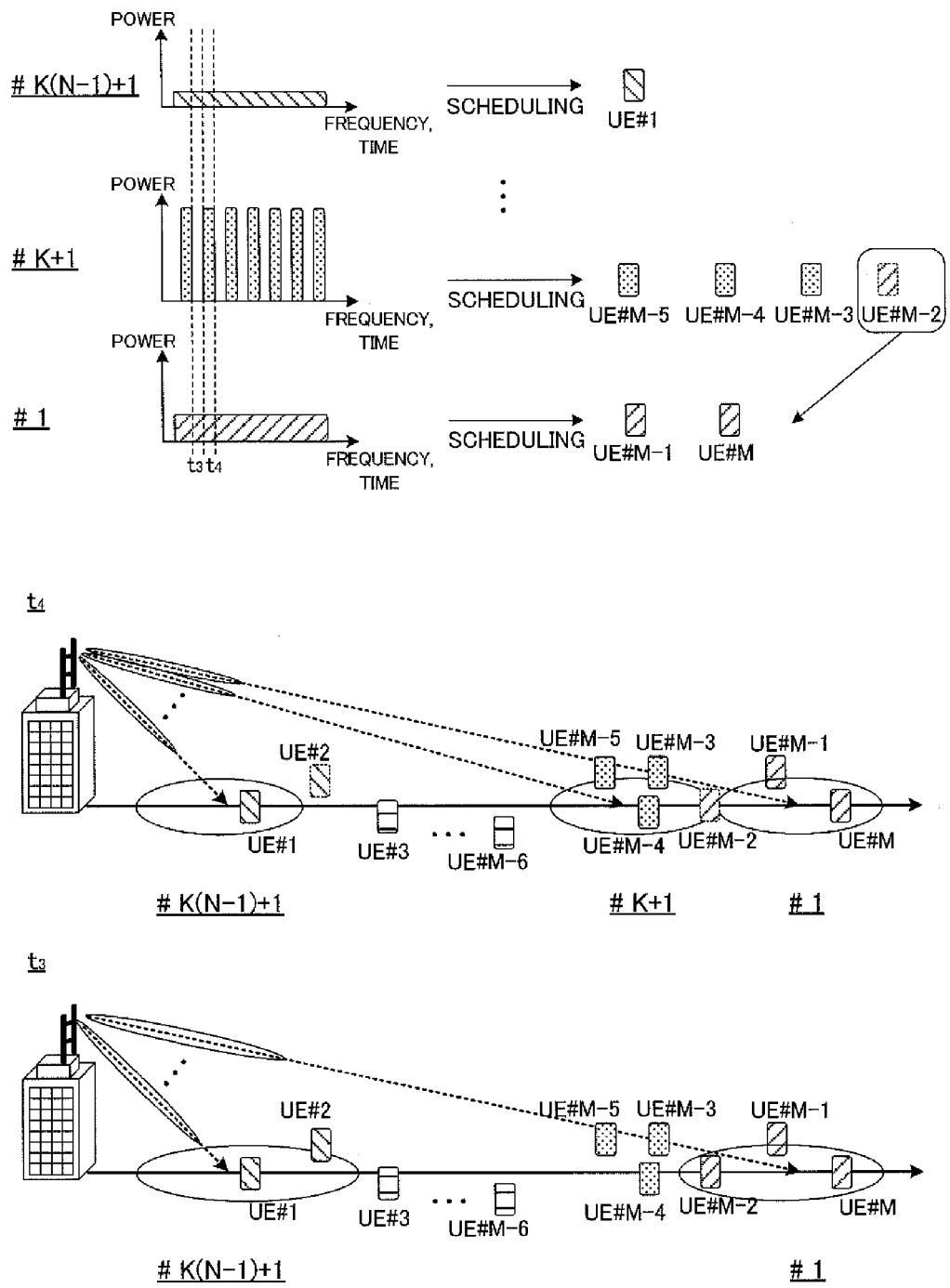
FIG. 15 is a diagram to show an example of a case where resources in each cell are controlled by executing ON/OFF control of each cell and also by synchronizing the antenna gain, beam width or tilt angle between cells, in time, based on the number of user terminals that are present in each of a plurality of cells, and the coverage area of a specific cell is expanded.

Also, as shown in FIG. 15, when three or more cells are vertically sectorized, too, it is possible to provide above time period $t_3$ periodically upon expanding the coverage area (range expansion) of a cell where the proportion of connecting user terminals is low. FIG. 15 shows a case where time period $t_3$, in which resources are selectively allocated to cells where the proportion of connecting user terminals is low (cell #K(N−1)+1 and cell #1), is provided, and the coverage area is expanded (range expansion) in this time period $t_3$. To be more specific, in time domain $t_3$, the radio base station makes a predetermined user terminal (UE #2) connect with a cell where the proportion of connecting user terminals is low (cell #K(N−1)+1) and makes a user terminal (UE #M−2) connect with cell #1, and allocate resources. Also, in time period $t_3$, it is possible to design control to expand the coverage areas of cells where the proportion of connecting user terminals is low (cell #K(N−1)+1 and cell #1 in FIG. 15) in the direction of the coverage area of a cell where the proportion of connecting user terminals is high (cell #K+1 in FIG. 15) formed in time period $t_4$ apart from time period $t_3$.

(Antenna)

The radio communication system according to the present embodiment has a radio base station that can form a plurality of beams that are vertically sectorized, and a user terminal that establishes wireless connection in cells formed by this radio base station, as described above. The radio base station has an antenna that outputs a plurality of beams to sectorize a plurality of cells vertically. As an example of an antenna of this kind, there is an array antenna that is formed with a plurality of antenna elements.

Figure 16C:
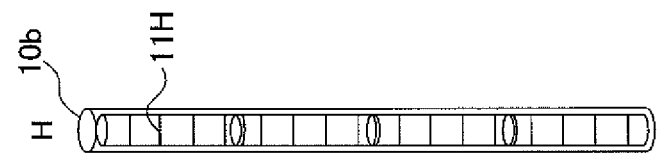
FIG. 16 provides conceptual diagrams of array antennas constituting an antenna apparatus.
Figure 16B:
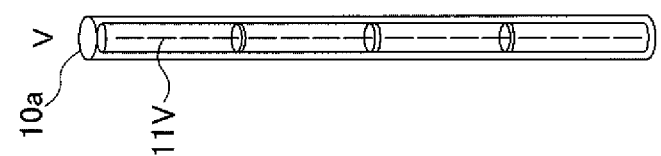
Figure 16A:
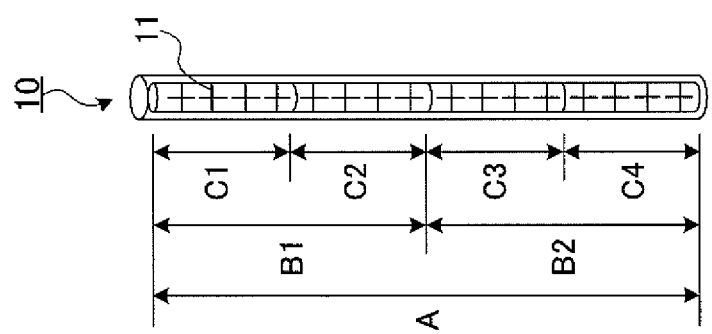

FIG. 16A is a conceptual diagram of an array antenna. As shown in FIG. 16A, an array antenna 10 is formed with a plurality of antenna elements 11 that are aligned in a line in one direction. In FIG. 16A, sixteen antenna elements 11 are shown as an example. With the present embodiment, the array antenna 10 is formed with a polarized antenna that is a combination of a vertically polarized antenna 10a and a horizontally polarized antenna 10b. However, the antennas that are applicable to the radio base station according to the present embodiment are by no means limited to this antenna configuration. Also, not only vertically polarized and horizontally polarized antennas, but also plus/minus 45-degree polarized antenna elements or an array antenna formed with antenna elements tilting these may be used as well.

FIG. 16B is a conceptual diagram showing the vertically polarized antenna 10a alone, and FIG. 16C is a conceptual diagram showing the horizontally polarized antenna 10b alone. When a polarized antenna is adopted, the individual antenna elements 11 are each formed with a set of vertically polarized elements 11V and horizontally polarized elements 11H.

Also, the radio base station is able to provide a plurality of communication types by using the above array antenna formed with a plurality of antenna elements. Now, a first communication type to a third communication type will be described as examples of a plurality of communication types which are applicable to the radio base station.

The first communication type is a type to form one antenna branch with the whole antenna, by forming one group A with all of the antenna elements 11 constituting the array antenna 10. The second communication type is a type to form two antenna branches with the whole antenna, by forming two groups B1 and B2, which divide the array antenna 10 vertically into two. The third communication type is a type to form four antenna branches, by forming four groups C1, C2, C3 and C4, which divide the array antenna 10 vertically into four.

Among the first communication type to the third communication type, the length of antennas to constitute one branch is the longest (that is, the number of antenna elements is the largest) with the first communication type. The length of antennas per branch becomes shorter as the number of antenna branches increases (the number of antenna elements decreases). Generally speaking, when beams are formed using an array antenna, it is possible to improve antenna gain and make the beam width smaller, as the number of antenna elements per branch increases. Consequently, according to the first communication type, the whole antenna is formed with one antenna branch, so that the antenna gain is maximized, and therefore it is possible to form sharp beams that are directed toward cell edges.

With the second communication type, the number of antenna elements per branch is half, so that, compared to the first communication type, the antenna gain decreases and furthermore the beam width becomes greater. With the third communication type, the number of antenna elements per branch decreases to 1/2 again from the second communication type, so that, compared to the second communication type, the antenna gain decreases and furthermore the beam width becomes greater.

Note that the present embodiment is not limited to the above first communication type to the third communication type, it is possible to adequately set an arbitrary number of communication types in accordance with the number of divisions of the antenna elements 11 forming the array antenna 10 in vertical directions. Also, the maximum number of branches can be selected as adequate, depending on the antenna elements 11. Also, the radio communication system according to the present embodiment is able to switch the branch configuration of the array antenna 10 depending on weight.

(Radio Communication System)

Now, the radio communication system according to the above-described embodiment will be described below in detail with reference to the accompanying drawings.

Figure 17:
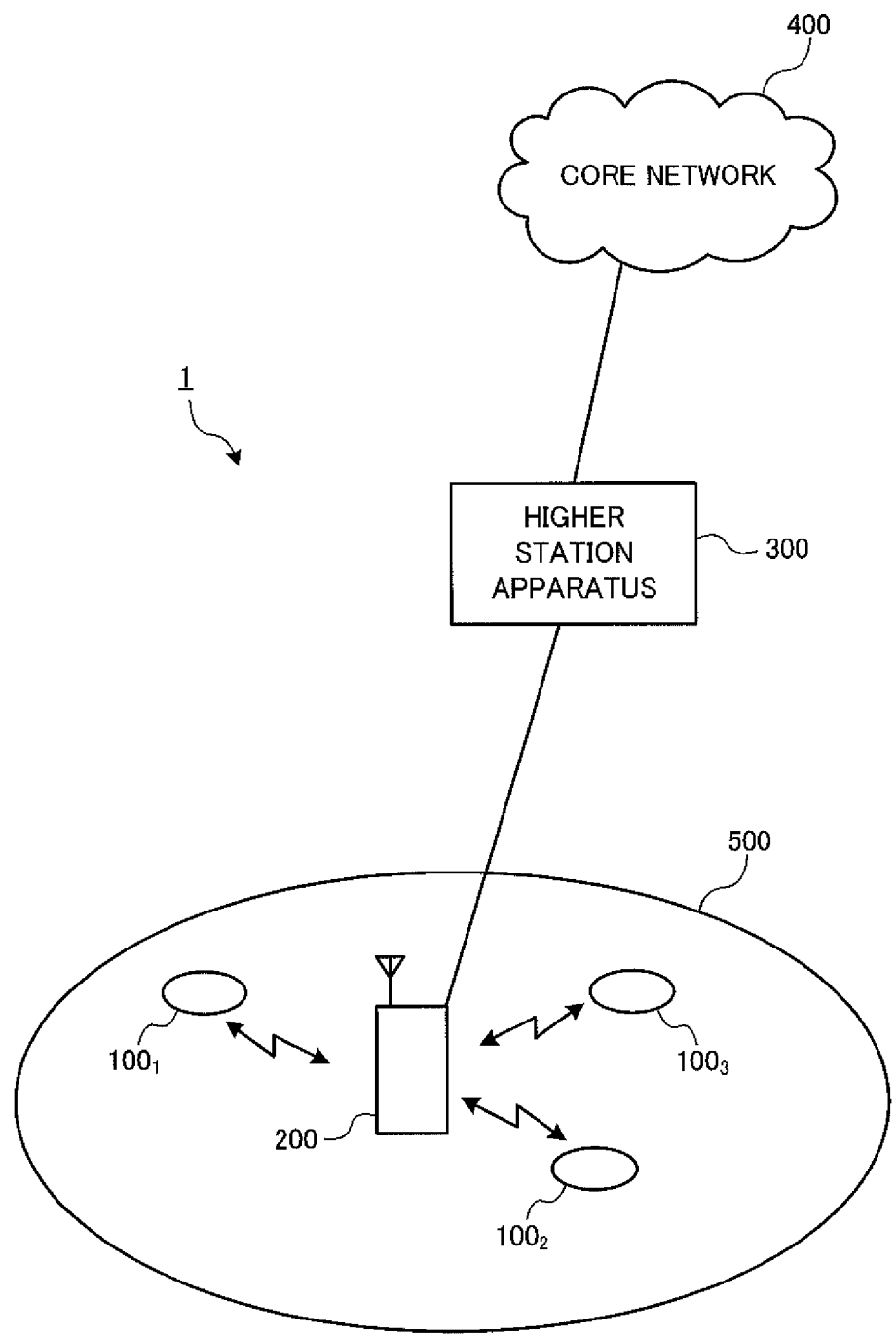
FIG. 17 is a diagram to show a network configuration of a radio communication system according to an embodiment.

A radio communication system 1 having a user terminal (hereinafter referred to as "mobile station 100") and a radio base station (eNodeB) 200 according to the present embodiment will be described with reference to FIG. 17. FIG. 17 is a diagram to explain the configuration of the radio communication system 1 having the mobile station 100 and radio base station 200 according to an embodiment of the present invention. Note that the radio communication system 1 shown in FIG. 17 is a system to accommodate, for example, the LTE system or SUPER 3G. Also, this radio communication system 1 may be referred to as "IMT-Advanced" or may be referred to as "4G."

As shown in FIG. 17, the radio communication system 1 is configured to include a radio base station 200 and a plurality of mobile stations 100 ($100_1$, $100_2$, $100_3$, ..., $100_n$, where n is an integer to satisfy n>0) that communicate with this radio base station 200. The radio base station 200 is connected with a higher station apparatus 300, and this higher station apparatus 300 is connected with a core network 400. The mobile stations 100 communicate with the radio base station 200 in a cell 500. Note that the higher station apparatus 300 may be, for example, an access gateway apparatus, a radio network controller (RNC), a mobility management entity (MME) and so on, but is by no means limited to these.

The mobile stations ($100_1$, $100_2$, $100_3$, ..., $100_n$) have the same configuration, functions and state, and therefore will be described simply as "mobile station 100," unless specified otherwise. Also, although the mobile station 100 will be described to perform radio communication with the radio base station 200 for ease of explanation, more generally, user equipment (UE) to include both mobile terminal apparatuses and fixed terminal apparatuses may be used as well.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in LTE/LTE-A systems will be described. On the downlink, a PDSCH, which is used by each mobile station 100 on a shared basis, and downlink L1/L2 control channels (PDCCH, PCFICH, PHICH), are used. By means of this PDSCH, user data—that is, normal data signals—is transmitted. Transmission data is included in this user data. Note that component carriers (CCs) allocated to mobile station 100 in the radio base station 200 and scheduling information are reported to the mobile station 100 through the L1/L2 control channels.

On the uplink, a PUSCH, which is used by each mobile station 100 on a shared basis, and a PUCCH, which is an uplink control channel, are used. User data is transmitted by means of this PUSCH. Also, downlink radio quality information (CQI: Channel Quality Indicator) and so on are transmitted by the PUCCH.

Figure 18:
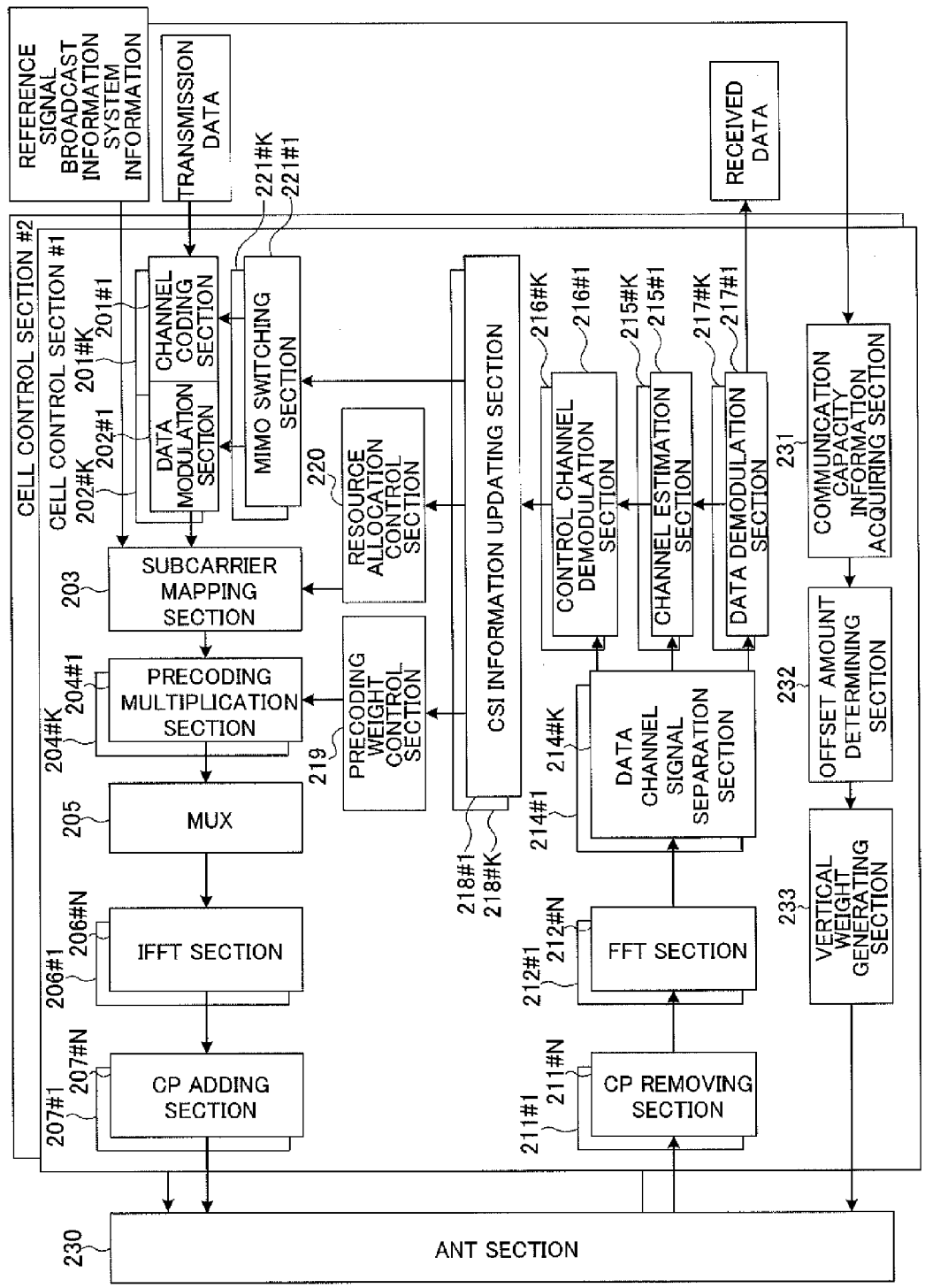
FIG. 18 is a block diagram to show a configuration of a radio base station according to an embodiment.
Figure 19:
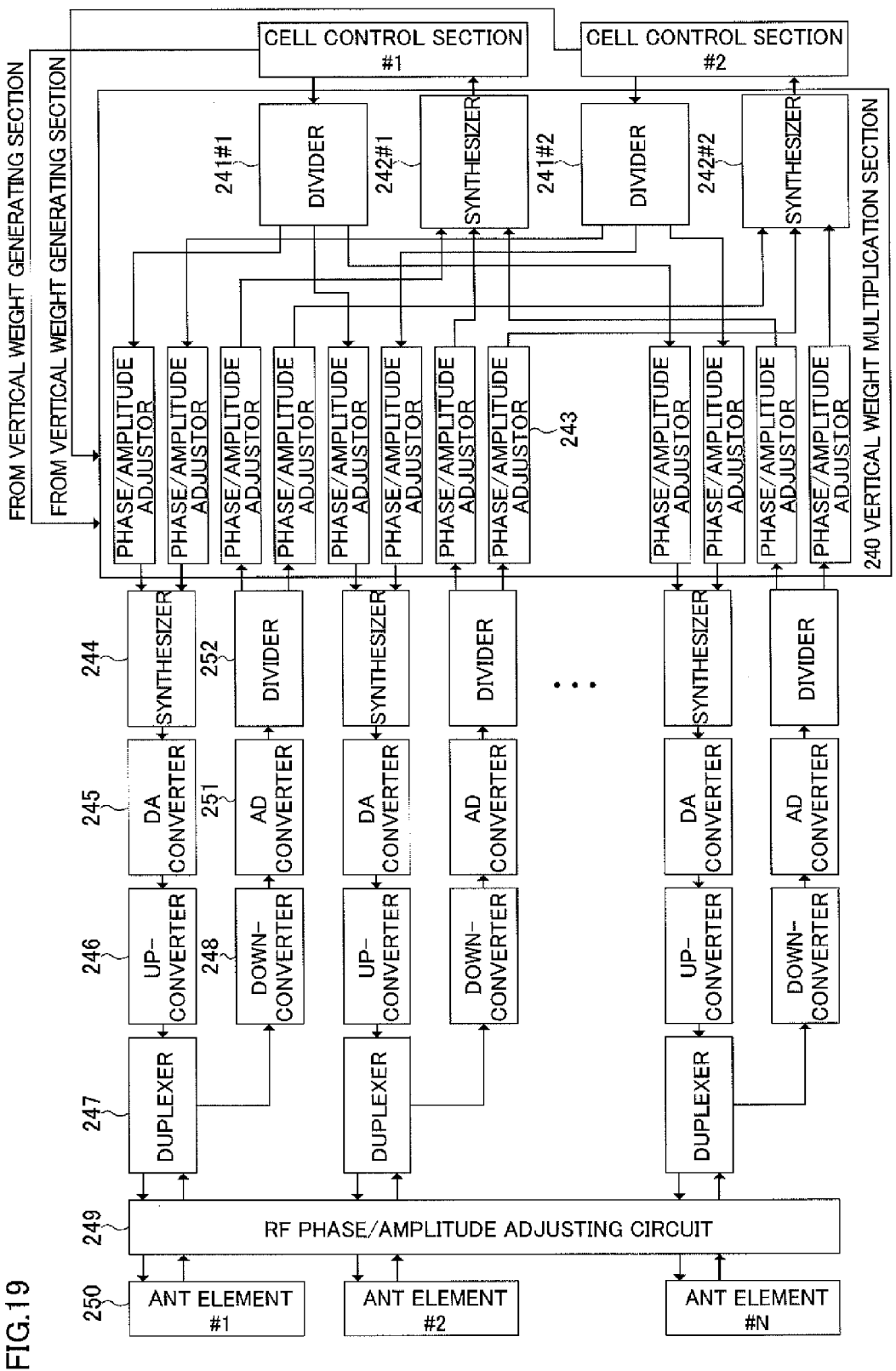
FIG. 19 is a block diagram to show a configuration of an antenna section according to an embodiment.
Figure 20:
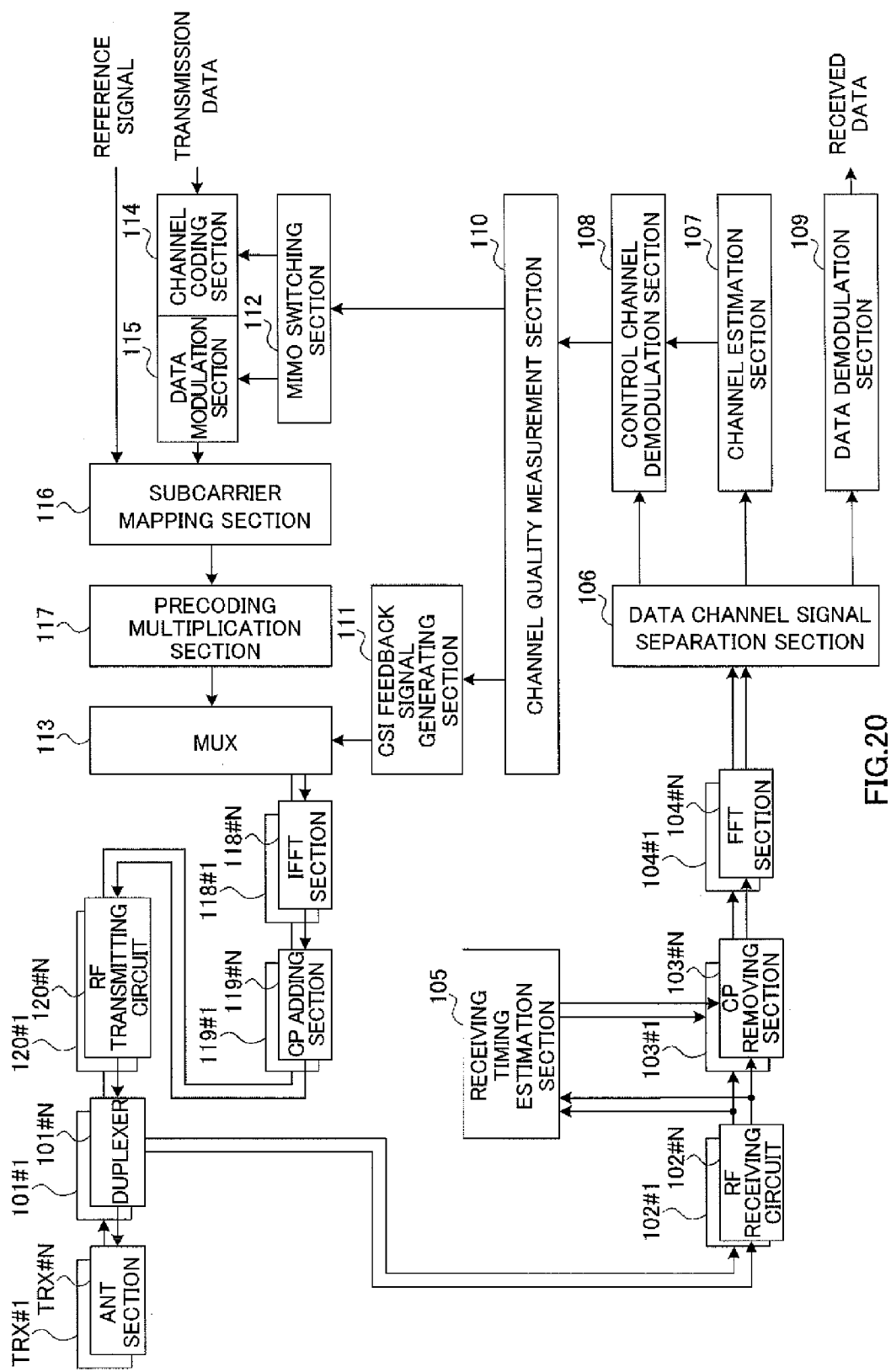
FIG. 20 is a block diagram to show a configuration of a mobile station according to an embodiment.

FIG. 18 is a block diagram to show a configuration of the radio base station 200 according to the present embodiment. FIG. 19 is block diagram to show a configuration of an antenna section 230. FIG. 20 is a block diagram to show a configuration of the mobile station 100 according to the present embodiment. Note that the configurations of the radio base station 200, antenna section 230 and mobile station 100 shown in FIG. 18 to FIG. 20 are simplified to explain the present invention, and are assumed to have configurations which a radio base station, an antenna section and a mobile station should normally have.

The radio base station 200 shown in FIG. 18 has, for example, cell control section #1 (hereinafter referred to as the "first cell control section") that controls the radio communication in the first cell in a two-cell configuration (for example, the inner cell), cell control section #2 (hereinafter referred to as the "second cell control section") that controls the radio communication in the second cell (for example, the outer cell), and an antenna section 230 that outputs the beams to form each cell. As described above, the radio base station 200 according to the present embodiment is not limited to a two-cell configuration, and may assume configurations with three or more cells. Assume that, in the case of a configuration with three or more cells, additional control sections such as a third cell control section and more can be provided in addition to the first cell control section and the second cell control section. Note that the radio base station 200 shown in FIG. 18 is a radio base station that controls the vertical plane beam width of each cell as described above.

First, the method of controlling the vertical plane beam width will be described. The radio base station 200 has a communication capacity information acquiring section 231 that acquires information about the communication capacity of each cell (for example, the proportion of connecting user terminals in each cell). The communication capacity information acquiring section 231 can acquire information about the number of user terminals present in each cell based on, for example, system information reported from a higher station apparatus and so on.

To be more specific, the communication capacity information acquiring section 231 acquires information about the number of user terminals that are present in each cell, and then converts the acquired information into data of the proportion of connecting user terminals connected to each cell. Note that the communication capacity information acquiring section 231 can acquire the number of user terminals to be connected to each cell in various other methods besides actually counting the number of user terminals that connect with each cell and perform radio communication. For example, the number of user terminals present in each cell may be calculated based on the assumption that the user terminals are distributed evenly over the area where each cell is formed. Also, it is equally possible to apply, as information about the number of user terminals, statistics given by calculating and processing the number of user terminals statistically, values given by calculating the number of user terminals taking into account the conditions of design of the radio base stations (for example, the place where each cell is formed, and so on), or values given by predicting the number of user terminals from past statistics, system simulations and so on.

The offset amount determining section 232 determines the offset values for changing the vertical plane beam widths of the beams forming the inner cell and the outer cell, based on the information acquired in the communication capacity information acquiring section 231. To be more specific, the offset amount determining section 232 determines the vertical plane beam widths and/or the transmission power offset values of the beams forming each cell based on the proportion of connecting user terminals in each cell, on a per cell basis, and outputs the determined offset values to a vertical weight generating section 233.

Also, the offset amount determining section 232 may prepare various combinations of amounts of offset in a database and determine predetermined offset values in accordance with the proportion of connecting user terminals in each cell. The database to define the amount of offset may be built based on information that has been acquired earlier in other radio base stations or values that are calculated based on simulation.

The vertical weight generating section 233 generates vertical weights (phase and amplitude) to apply in the antenna section 230, based on the offset values determined in the offset amount determining section 232. The vertical weights generated in the vertical weight generating section 233 are output to the antenna section 230, and, in the antenna section 230, transmission signals are multiplied by the weights, thereby controlling the vertical plane beam widths of the beams to be output from the antenna section 230.

Note that, when controlling transmission power, too, it is equally possible to control the transmission power of the beams to output, based on the power offset values that are determined in the offset amount determining section 232 based on the information acquired in the communication capacity information acquiring section 231. Similarly, when controlling resource allocation, too, a scheduler may control the resources to allocate to each cell based on the information acquired in the communication capacity information acquiring section 231.

Although FIG. 18 shows a configuration to provide a communication capacity information acquiring section 231, an offset amount determining section 232, and a vertical weight generating section 233 for each of the first cell control section and the second cell control section, this is by no means limiting. A configuration may be possible in which at least one of the communication capacity information acquiring section 231, the offset amount determining section 232, and the vertical weight generating section 233 (for example, the communication capacity information acquiring section 231 and the offset amount determining section 232) is provided for control sections for a plurality of cells (in FIG. 18, the first cell control section and the second cell control section) on a shared basis.

Next, control of transmitting/received data will be described. In the radio base station 200 shown in FIG. 18, a scheduler, which is not shown, determines the number of users to multiplex (the number of users multiplexed) based on channel estimation values given from channel estimation sections 215 #1 to 215 #K, which will be described later. Then, the content of uplink and downlink resource allocation (scheduling information) for each user is determined, and transmission data #1 to #K for users #1 to #K are output to corresponding channel coding sections 201 #1 to 201 #K.

The transmission data is subjected to channel coding in channel coding sections 201 #1 to 201 #K, and, after that, output to data modulation sections 202 #1 to 202 #K and subjected to data modulation. At this time, the channel coding and data modulation are executed based on channel coding rates and modulation schemes given from MIMO switching sections 221 #1 to 221 #K, which will be described later. Transmission data #1 to #K subjected to data modulation in data modulation sections 202 #1 to 202 #K are converted from time sequence signals to frequency domain signals through a discrete Fourier transform in an unillustrated discrete Fourier transform section, and output to a subcarrier mapping section 203.

The subcarrier mapping section 203 maps transmission data #1 to #K to subcarriers in accordance with resource allocation information given from a resource allocation control section 220, which will be described later. At this time, the subcarrier mapping section 203 maps (multiplexes) reference signals #1 to #K input from an unillustrated reference signal generating section and broadcast information and system information input from a broadcast information generating section and a system information generating section, to subcarriers, with transmission data #1 to #K. In this way, transmission data #1 to #K mapped to the subcarriers are output to precoding multiplication sections 204 #1 to 204 #K.

Precoding multiplication sections 204 #1 to 204 #K apply a phase and/or amplitude shift to transmission data #1 to #K, for each of antenna elements #1 to #N, based on precoding weights given from a precoding weight control section 219, which will be described later (weighting of antenna elements #1 to #N by precoding). Transmission data #1 to #K, to which a phase and/or amplitude shift has been applied by precoding multiplication sections 204 #1 to 204 #K, are output to a multiplexer (MUX) 205.

In the multiplexer (MUX) 205, transmission data #1 to #K, having been subjected to a phase and/or amplitude shift, are synthesized to generate transmission signals for each of antenna elements #1 to #N. The transmission signals generated in the multiplexer (MUX) 205 are converted from frequency domain signals to time domain signals through an inverse fast Fourier transform in inverse fast Fourier transform sections (IFFT) 206 #1 to 206 #N. Then, after CPs are added in cyclic prefix (CP) adding sections 207 #1 to 207 #N, the signals are output to the antenna section 230.

Meanwhile, transmission signals that are transmitted from the mobile station 100 on the uplink are received in the antenna section 230, and converted from radio frequency signals into baseband signals through frequency conversion. The baseband signals subjected to frequency conversion have the CPs removed in CP removing sections 211 #1 to 211 #N, and output to fast Fourier transform sections (FFT sections) 212 #1 to 212 #N.

FFT sections 212 #1 to 212 #N perform a Fourier transform of the input received signals, and convert the signals from time sequence signals to frequency domain signals. The received signals having been converted to frequency domain signals are output to data channel signal separation sections 214 #1 to 214 #K.

Data channel signal separation sections 214 #1 to 214 #K separate the received signals input from FFT sections 212 #1 to 212 #N, by, for example, minimum mean squared error (MMSE) and maximum likelihood detection (MLD) signal separation methods. By this means, the received signals having arrived from the mobile station 100 are separated into received signals pertaining to user terminal #1 to user terminal #K.

Channel estimation sections 215 #1 to 215 #K estimate channel states from the reference signals included in the received signals separated in data channel signal separation sections 214 #1 to 214 #K, and report the estimated channel states to control channel demodulation sections 216 #1 to 216 #K.

The received signals pertaining to user terminal #1 to user terminal #K, separated in data channel signal separation sections 214 #1 to 214 #K, are demapped in an unillustrated subcarrier demapping section and converted back to time sequence signals, and then demodulated in data demodulation sections 217 #1 to 217 #K.

Control channel demodulation sections 216 #1 to 216 #K demodulate the control channel signals (for example, the PUCCH) included in the received signals separated in data channel signal separation sections 214 #1 to 214 #K. At this time, in control channel demodulation sections 216 #1 to 216 #K, the control channel signals corresponding to user terminal #1 to user terminal #K are demodulated based on the channel states reported from channel estimation sections 215 #1 to 215 #K. The control channel signals demodulated in control channel demodulation sections 216 #1 to 216 #K are output to CSI information updating sections 218 #1 to 218 #K.

CSI information updating sections 218 #1 to 218 #K extract channel state information (CSI) included in each control channel signal (for example, the PUCCH) or shared data channel signal (PUCCH) input from control channel demodulation sections 216 #1 to 216 #K, so that CSI is always updated to the latest state. For example, the CSI includes PMIs, RIs and CQIs.

The CSI information updated in CSI information updating sections 218 #1 to 218 #K is output to the precoding weight control section 219, the resource allocation control section 220 and MIMO switching sections 221 #1 to 221 #K.

Based on beam selection information and the CSI information input from CSI information updating sections 218 #1 to 218 #K, the precoding weight control section 219 generates precoding weights to represent the amounts of phase and/or amplitude shift for transmission data #1 to #K. The generated precoding weights are output to precoding multiplication sections 204 #1 to 204 #K, and are used in the precoding of transmission data #1 to transmission data #K.

Based on the CSI information input from CSI information updating sections 218 #1 to 218 #K, the resource allocation control section 220 determines the resource allocation information to allocate to each user.

MIMO switching sections 221 #1 to 221 #K select the MIMO transmission schemes to use for transmission data #1 to transmission data #K, based on the CSI information input from CSI information updating sections 218 #1 to 218 #K. Then, the channel coding rates and modulation schemes for transmission data #1 to transmission data #K to match the selected MIMO transmission schemes are determined. The determined channel coding rates are output to channel coding sections 201 #1 to 201 #K, and the determined modulation schemes are output to the data modulation sections 202 #1 to 202 #K.

Next, the configuration of the antenna section 230 will be described with reference to FIG. 19. The antenna section 230 has a plurality of antenna elements 250, an RF phase/amplitude adjusting circuit 249, and a vertical weight multiplication section 240, and so on.

In the antenna section 230, signals that are output from the CP adding sections 207 of the first cell control section and the second cell control section are input in the vertical weight multiplication section 240. Also, information about the vertical weights generated in the vertical weight generating sections 233 of the first cell control section and the second cell control section is also input in the vertical weight multiplication section 240.

In the vertical weight multiplication section 240, signals from the first cell control section and the second cell control section are branched via dividers 241 #1 and 241 #2, and are output to phase/amplitude adjustors 243 corresponding to each of a plurality of antenna elements 250. The vertical weight multiplication section 240 multiplies the vertical weights so that the offset values (here, vertical plane beam width offset values) determined in the offset amount determining section 232 are implemented, in the phase/amplitude adjustors 243.

The transmission signals in the first cell (for example, the inner cell) and the second cell (for example, the outer cell), output from the vertical weight multiplication section 240, are synthesized in a synthesizer 244 and then output to the RF phase/amplitude adjusting circuit 249 via a DA converter 245, an up-converter 246, and a duplexer 247. The RF phase/amplitude adjusting circuit 249 adjusts the directions of the beams to form the first cell and the second cell, and furthermore carries out calibration between the branches. Signals output from the RF phase/amplitude adjusting circuit 249 are output via the antenna elements 250.

Meanwhile, transmission signals transmitted from the mobile station 100 on the uplink are received in antenna elements 250, and then output to the duplexer 247 via the RF phase/amplitude adjusting circuit 249. The transmission signals are separated into the transmitting path and the receiving path in the duplexer 247, and then output to a divider 252 via a down-converter 248 and an AD converter 251. In the divider 252, the signals are branched into the signals of the first cell and the second cell, and then output to synthesizers 242 #1 and 242 #2 via the phase/amplitude adjustors 243 of the vertical weight multiplication section 240. In synthesizers 242 #1 and 242 #2 of the vertical weight multiplication section 240, the received signals received in the antenna elements 250 are synthesized for each of the first cell and the second cell, and output to the first cell control section and the second cell control section.

Next, the configuration of the mobile station 100 will be described with reference to FIG. 20. In the mobile station 100 shown in FIG. 20, transmission signals output from the radio base station 200 are received by transmitting/receiving antennas TRX #1 to TRX #N, separated into the transmitting path and the receiving path in duplexers 101 #1 to 101 #N, and then output to RF receiving circuits 102 #1 to 102 #N. Then, in RF receiving circuits 102 #1 to 102 #N, the radio frequency signals are converted into baseband signals through frequency conversion. The baseband signals have the CPs removed in cyclic prefix (CP) removing sections 103 #1 to 103 #N, and are output to fast Fourier transform sections (FFT sections) 104 #1 to 104 #N. A receiving timing estimation section 105 estimates the receiving timing from the reference signals included in the received signals, and reports the estimated results to CP removing sections 103 #1 to 103 #N. FFT sections 104 #1 to 104 #N perform a Fourier transform on the received signals that are received as input, and convert the time sequence signals into frequency domain signals. The received signals, having been converted into frequency domain signals, are output to a data channel signal separation section 106.

The data channel signal separation section 106 separates the received signals input from FFT sections 104 #1 to 104 #N by, for example, minimum mean square error (MMSE) and maximum likelihood detection (MLD) signal separation methods. By this means, the received signals that have arrived from the radio base station 200 are separated into received signals pertaining to user terminal #1 to user terminal #K, and the received signal pertaining to the user of the mobile station 100 (here, user K) is extracted. A channel estimation section 107 estimates the channel states from the reference signals included in the received signals separated in the data channel signal separation section 106, and reports the estimated channel states to a control channel demodulation section 108.

The received signal pertaining to user terminal #K, separated in the data channel signal separation section 106, is demapped in a subcarrier demapping section, which is not shown, converted back to a time sequence signal, and then demodulated in a data demodulation section 109. Then, as channel decoding is executed in a channel decoding section, which is not shown, transmission signal #K is reconstructed.

The control channel demodulation section 108 demodulates the control channel signal (for example, the PDCCH) included in the received signal separated in the data channel signal separation section 106. When this takes place, the control channel demodulation section 108 demodulates the control channel signal corresponding to user terminal #K, based on the channel state reported from the channel estimation section 107. The control channel signals demodulated by the control channel demodulation section 108 are output to a channel quality measurement section 110.

The channel quality measurement section 110 measures channel quality (CQIs) based on the control channel signals received as input from the control channel demodulation section 108. Also, the channel quality measurement section 110 selects PMIs and RIs based on the measured CQIs. Then, CSI (CQIs, PMIs and RIs) or RSRP is reported to a CSI feedback signal generating section 111 and a MIMO switching section 112.

In the CSI feedback signal generating section 111, CSI feedback signals to feed back to the radio base station 200 are generated. In this case, the CQIs, PMIs and RIs reported from the channel quality measurement section 110 are included in the CSI feedback signals. The feedback signals (CSI feedback or RSRP feedback) generated in the CSI feedback signal generating section 111 are output to a multiplexer (MUX) 113.

Based on the CQIs, PMIs and RIs input from the channel quality measurement section 110, the MIMO switching section 112 selects the MIMO transmission scheme to use for transmission data #K. Then, the channel coding rate and modulation scheme for transmission data #K, to match the selected MIMO transmission scheme, are determined. The determined channel coding rates are output to a channel coding section 114, and the determined modulation schemes are output to a data modulation section 115.

Meanwhile, transmission data #K pertaining to user #K, transmitted from a higher layer, is subjected to channel coding by the channel coding section 114, and then subjected to data modulation in the data modulation section 115. Transmission data #K, having been subjected to data modulation in the data modulation section 115, is converted from a time sequence signal to a frequency domain signal in a serial-to-parallel conversion section, which is not shown, and output to a subcarrier mapping section 116.

The subcarrier mapping section 116 maps transmission data #K to subcarriers in accordance with schedule information that is designated from the radio base station 200. At this time, the subcarrier mapping section 116 maps (multiplexes) reference signal #K, generated in a reference signal generating section (not shown), to the subcarriers with transmission data #K. Transmission data #K mapped to subcarriers in this way is output to a precoding multiplication section 117.

The precoding multiplication section 117 applies a phase and/or amplitude shift to transmission data #K, for each of transmitting/receiving antennas TRX #1 to TRX #N. Then, the precoding multiplication section 117 applies a phase and/or amplitude shift in accordance with the precoding weights that correspond to the PMIs that are designated by the control channel signals demodulated in the control channel demodulation section 108. Transmission data #K, having been subjected to a phase and/or amplitude shift by the precoding multiplication section 117, is output to the multiplexer (MUX) 113.

The multiplexer (MUX) 113 synthesizes transmission data #K, to which a phase and/or amplitude shift has been applied, with the control signals generated in the CSI feedback signal generating section 111, and generates transmission signals for each of transmitting/receiving antennas TRX #1 to TRX #N. The transmission signals generated in the multiplexer (MUX) 113 are converted from frequency domain signals to time domain signals through an inverse fast Fourier transform in inverse fast Fourier transform sections 118 #1 to 118 #N, and then have CPs added in CP adding sections 119 #1 to 119 #N, and are output to RF transmitting circuits 120 #1 to 120 #N. Then, after the frequency conversion process into a radio frequency band is executed in RF transmitting circuits 120 #1 to 120 #N, the signals are output to transmitting/receiving antennas TRX #1 to TRX #N via duplexers 101 #1 to 101 #N, and output from transmitting/receiving antennas TRX #1 to TRX #N to the radio base station 200 on the uplink.

Note that the configurations of the radio base station 200 that are applicable with the present embodiment are not limited to the configuration shown in above FIG. 18. Similarly, the configuration of the antenna section 230 is also not limited to the configuration shown in FIG. 19. As other configurations, a configuration may be possible in which the vertical weight multiplication section 240 is provided in the inner cell control section and the outer cell control section. Examples of the configurations of the radio base station 200 and the antenna section 230 in this case will be described with reference to FIG. 21 to FIG. 23. Note that descriptions of parts that overlap with above FIG. 18 and FIG. 19 will be omitted.

Figure 21:
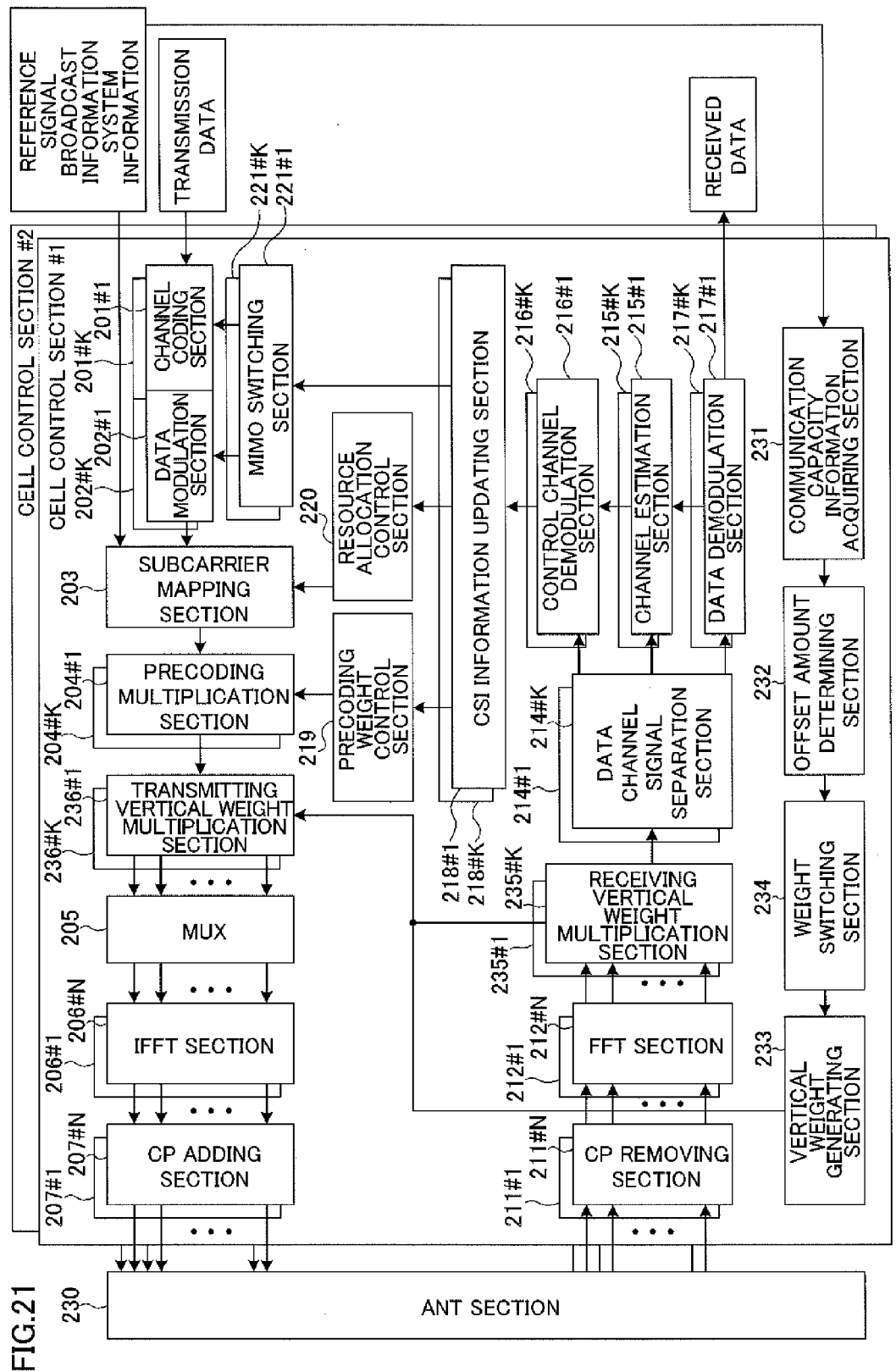
FIG. 21 is a block diagram to show another configuration of a radio base station according to an embodiment.

The radio base station 200 shown in FIG. 21 has transmitting vertical weight multiplication sections 236 #1 to #K that multiply transmitting/received signals by vertical weights in the first cell control section and the second cell control section, and receiving vertical weight multiplication sections 235 #1 to #K.

In the first cell control section and the second cell control section of the radio base station 200, vertical weights that are generated in the vertical weight generating section 233 are controlled in a weight switching section 234, and output to transmitting vertical weight multiplication sections 236 #1 to #K and receiving vertical weight multiplication sections 235 #1 to #K. The weight switching section 234 controls and switches between a plurality of weights output from the vertical weight generating section 233 per predetermined period, and outputs the vertical weights generated in the vertical weight generating section 233 to transmitting vertical weight multiplication sections 236 #1 to #K and receiving vertical weight multiplication sections 235 #1 to #K.

For example, as shown in above FIG. 11 to FIG. 15 and so on, when time allocation control is applied, when the vertical plane beam width and tilt angle of each cell are changed per predetermined period, the control is executed in the weight switching section 234. To be more specific, from the data of the proportion of user terminals connected to each cell generated in the communication capacity information acquiring section 231 and the offset values determined in the offset amount determining section 232, the weight switching section 234 determines the length of time to allocate to $t_1$ and $t_2$ or to $t_3$ and $t_4$ such that resources are allocated adequately (for example, evenly) to each user terminal. Also, the weight switching section 234 designs control such that, together with each user terminal's scheduling information allocated in the subcarrier mapping section 203, and in coordination with the passage of the above time period, a plurality of weights output from the vertical weight generating section 233 are switched and output to transmitting vertical weight multiplication sections 236 #1 to #K.

Furthermore, information about the transmission timing of the mobile station and so on determined based on the length of time allocated to $t_1$ and $t_2$ or to $t_3$ and $t_4$, is reported from the radio base station to the mobile station by means of broadcast information. Each user terminal receives the signals transmitted from the radio base station normally, and, meanwhile, as for the transmission timing, controls the transmission schedule in accordance with the transmission timing reported from the radio base station by means of broadcast information. The radio base station then designs control such that, in coordination with the above time period, a plurality of weights output from the vertical weight generating section 233 are switched and output to receiving vertical weight multiplication sections 235 #1 to #K, thereby receiving the signals from each mobile station with coordinated timing.

Figure 22:
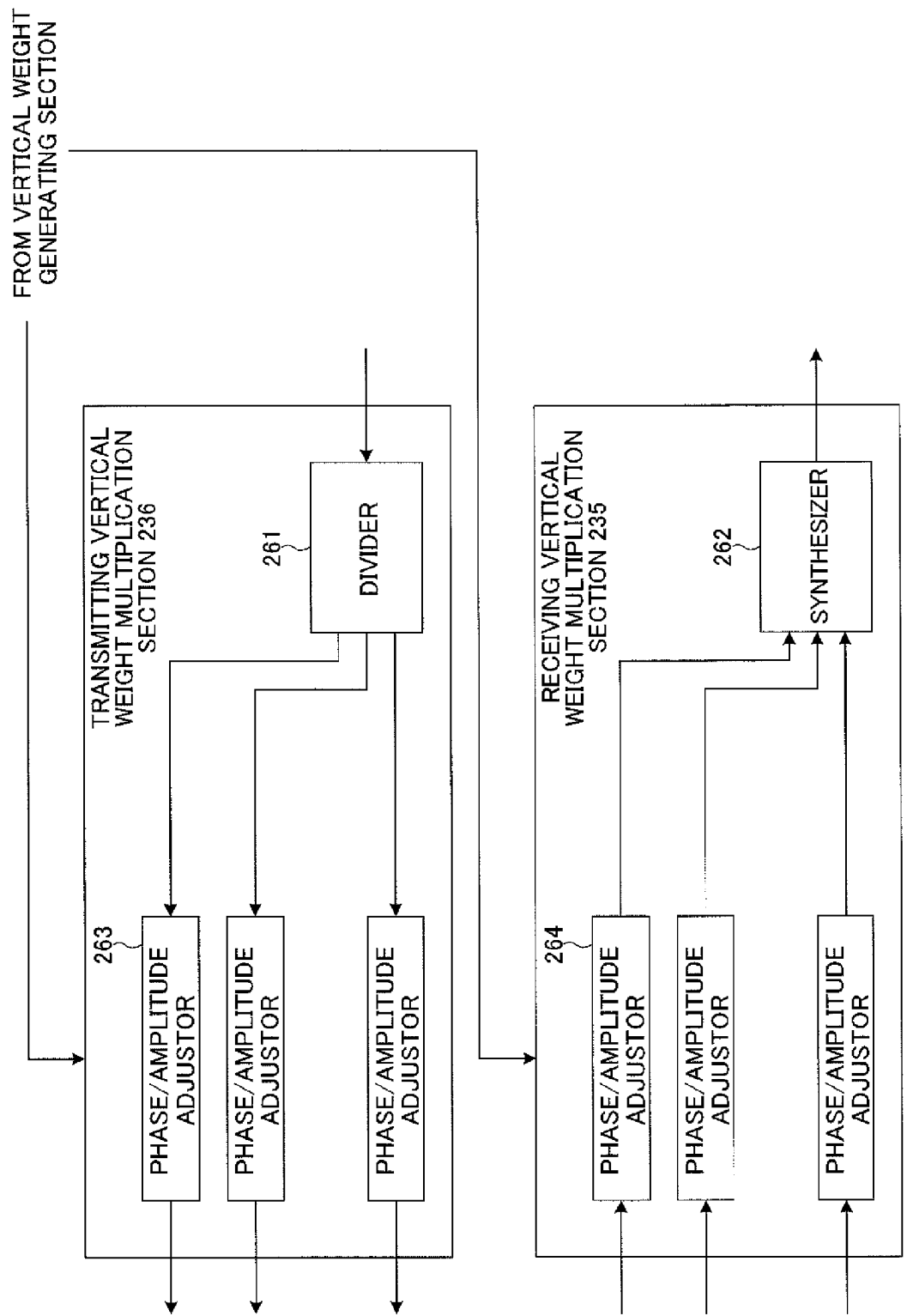
FIG. 22 is a block diagram to show a transmitting/receiving vertical weight multiplication section in a radio base station.
Figure 23:
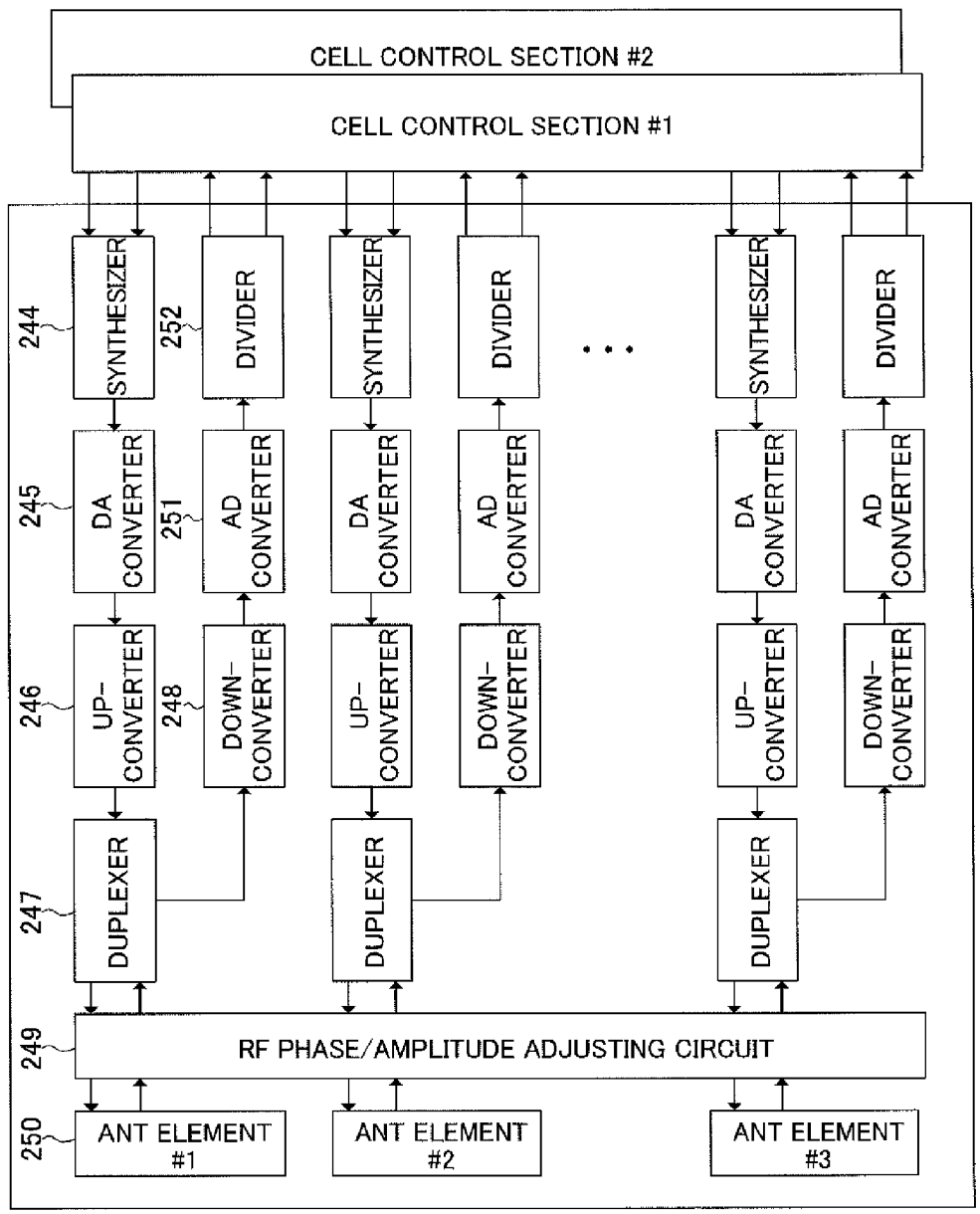
FIG. 23 is a block diagram to show another configuration of an antenna section according to an embodiment.

FIG. 22 shows a block diagram of the transmitting vertical weight multiplication section 236. In the transmitting vertical weight multiplication section 236, signals output from the precoding multiplication section 204 are branched in a divider 261, and output to phase/amplitude adjustors 263 corresponding to a plurality of antenna elements 250. In the phase/amplitude adjustors 263, weights that are generated in the vertical weight generating section 233 are multiplied on the signals. After the signals output from the FFT section 212 are adjusted in a phase/amplitude adjustor 264, the receiving vertical weight multiplication section 235 synthesizes these in a synthesizer 262, and output the result to a data channel signal separation section 214. Note that, when a vertical weight multiplication section is provided in the first cell control section and the second cell control section, the antenna section 230 may assume a configuration removing the vertical weight multiplication section 240 from the configuration shown in FIG. 19, as shown in FIG. 23.

Now, although the present invention has been described in detail with reference to the above embodiment, it should be obvious to a person skilled in the art that the present invention is by no means limited to the embodiment described herein. For example, the number of users and the number of processing sections in the devices in the above-described embodiment are by no means limiting, and it is equally possible to change these as appropriate depending on device configurations. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2012-081085, filed on Mar. 30, 2012, including the specification, drawings, and abstract, is incorporated herein by reference in its entirety.

The invention claimed is:

1. A radio communication method for a radio base station that outputs a plurality of beams of varying tilt angles and forms a plurality of cells in a vertical direction, and a user terminal that establishes wireless connection with the radio base station, the radio communication method comprising the steps in which:
  the radio base station:
    acquires information about communication capacity of each of the plurality of cells; and
    sets the amount of resources to allocate to a cell having lower communication capacity among the plurality of cells lower than for a cell having higher communication capacity,
  wherein the radio base station makes at least one of a frequency range to allocate resources to the call having lower communication capacity among the plurality of cells and a time period to allocate resources, narrower than for the cell having higher communication capacity,
  wherein the radio base station provides a time period to allocate resources to the cell having higher communication capacity and not allocate resources to the cell having lower communication capacity, and, in the time period, increases the transmission power of the cell having higher communication capacity, and
  wherein, in the time period, the radio base station changes a tilt angle of the beam forming the cell having higher communication capacity so that a coverage area of the cell having higher communication capacity expands in a direction of the coverage area of the cell having lower communication capacity formed outside the time period.

2. A radio communication method for a radio base station that outputs a plurality of beams of varying tilt angles and forms a plurality of cells in a vertical direction, and a user terminal that establishes wireless connection with the radio base station, the radio communication method comprising the steps in which:
  the radio base station:
    acquires information about communication capacity of each of the plurality of cells;
    selects a predetermined user terminal that can connect with a cell having lower communication capacity with predetermined quality or above, among user terminals that are present in a coverage area of a cell having higher communication capacity among the plurality of cells; and
    provides a time period to allocate resources to the cell having lower communication capacity and not allocate resources to the cell having higher communication capacity, and, in the time period, allocate resources to the predetermined user terminal from the cell having lower communication capacity,
  wherein, in the time period, the radio base station changes at least one of a tilt angle and a vertical plane beam width of a beam to form the cell having lower communication capacity so that a coverage area of the cell having lower communication capacity expands in a direction of the coverage area of the cell having higher communication capacity formed outside the time period.

3. A radio base station that forms a plurality of cells in a vertical direction, the radio base station comprising:
  an antenna section configured to output a plurality of beams of varying tilt angles and form a plurality of cells;
  an information acquiring section configured to acquire information about communication capacity of each of the plurality or cells; and
  a control section configured to set the amount of resources to allocate to a cell having lower communication capacity among the plurality of cells lower than for a cell having higher communication capacity,
  wherein the control section makes at least one of a frequency range to allocate resources to the cell having lower communication capacity among the plurality of cells and a time period to allocate resources, narrower than for the cell having higher communication capacity,
  wherein the control provides a time period to allocate resources to the cell having higher communication capacity and not allocate resources to the cell having lower communication capacity, and, in the time period, increases the transmission power of the cell having higher communication capacity,
  wherein, in the time period, the control section changes a tilt angle of the beam forming the cell having higher communication capacity so that a coverage area of the cell having higher communication capacity expands in a direction of the coverage area of the cell having lower communication capacity formed outside the time period.

4. A radio communication system comprising a radio base station that forms a plurality of cells in a vertical direction and a user terminal that establishes wireless connection with the radio base station, wherein the radio base station comprises:
  an antenna section configured to output a plurality of beams of varying tilt angles and form a plurality of cells;
  an information acquiring section configured to acquire information about communication capacity of each of the plurality of cells; and
  a control section configured to set the amount of resources to allocate to a cell having lower communication capacity among the plurality of cells lower than for a cell having higher communication capacity,
  wherein the control section makes at least one of a frequency range to allocate resources to the cell having lower communication capacity among the plurality of cells and a time period to allocate resource, narrower than for the cell having higher communication capacity,
  wherein the control section provides a time period to allocate to the cell having higher communication capacity and not allocate resources to the cell having lower communication capacity, and, in the time period, increases the transmission power of the cell having higher communication capacity,
  wherein, in the time period, the control section changes a tilt angle of the beam forming the cell having higher communication capacity so that a coverage area of the cell having higher communication capacity expands in a direction of the area of the cell having lower communication capacity formed outside the time period.

* * * * *